United States Patent
Larsson et al.

(10) Patent No.: US 8,351,334 B2
(45) Date of Patent: Jan. 8, 2013

(54) QUALITY-BASED DATA SCHEDULING

(75) Inventors: Peter Larsson, Solna (SE); Niklas Johansson, Sollentuna (SE); Michael Meyer, Aachen (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 428 days.

(21) Appl. No.: 11/816,071

(22) PCT Filed: Feb. 10, 2005

(86) PCT No.: PCT/SE2005/000182
§ 371 (c)(1), (2), (4) Date: Aug. 10, 2007

(87) PCT Pub. No.: WO2006/085801
PCT Pub. Date: Aug. 17, 2006

(65) Prior Publication Data
US 2008/0144552 A1 Jun. 19, 2008

(51) Int. Cl.
*G01R 31/08* (2006.01)
(52) U.S. Cl. ................................ 370/236; 370/338
(58) Field of Classification Search ............... 370/236.2, 370/241.1, 238, 236.1, 236
See application file for complete search history.

(56) References Cited

U.S. PATENT DOCUMENTS

| | | | |
|---|---|---|---|
| 6,449,490 B1 | 9/2002 | Chaponniere et al. | |
| 6,934,297 B1* | 8/2005 | Bensaou et al. | 370/445 |
| 7,464,166 B2* | 12/2008 | Larsson et al. | 709/228 |
| 2001/0056560 A1 | 12/2001 | Khan et al. | |
| 2002/0051425 A1* | 5/2002 | Larsson | 370/252 |
| 2002/0191573 A1* | 12/2002 | Whitehill et al. | 370/338 |
| 2004/0205105 A1* | 10/2004 | Larsson et al. | 709/200 |
| 2004/0233918 A1 | 11/2004 | Larsson et al. | |
| 2005/0154965 A1* | 7/2005 | Ichiki et al. | 714/776 |
| 2005/0213505 A1* | 9/2005 | Iochi et al. | 370/236 |
| 2008/0089314 A1* | 4/2008 | Meyer et al. | 370/349 |
| 2008/0123579 A1* | 5/2008 | Kozat et al. | 370/312 |

FOREIGN PATENT DOCUMENTS

| | | |
|---|---|---|
| EP | 1 458 118 A1 | 9/2004 |
| WO | 00/21236 | 4/2000 |
| WO | WO 00/49760 | 8/2000 |
| WO | 02/35779 | 5/2002 |

(Continued)

OTHER PUBLICATIONS

International Search Report for PCT/SE2005/000182 mailed Oct. 5, 2005.

(Continued)

*Primary Examiner* — Mark Rinehart
*Assistant Examiner* — Matthew Hopkins
(74) *Attorney, Agent, or Firm* — Nixon & Vanderhye, P.C.

(57) ABSTRACT

The present invention relates to quality-based scheduling of data in wireless networks. In this scheduling, quality information representing the degree of decodability of previously transmitted but not correctly received and not successfully decoded data packets is estimated in receiving communications nodes. This quality information is reported back to the node that transmitted the packet. The quality information will be used by the transmitting node when scheduling subsequent data transmissions. In this scheduling process, at least one of selection of: i) receiving node(s), to which a second data packet is to be forwarded; ii) a type of the data in the second packet; and/or iii) a data flow, to which the second packet belongs, is performed based on the quality information.

25 Claims, 9 Drawing Sheets

FOREIGN PATENT DOCUMENTS

WO 2004/091154 10/2004
WO 2004/091155 10/2004

OTHER PUBLICATIONS

English translation of Chinese Office Action mailed Dec. 25, 2009 in Chinese application 200580047993.7.

A. Roongta and J. M. Shea, "Reliability-based Hybrid ARQ using Convolutional codes", Proc. 2003 IEEE Intl. Conf on Commun., vol. 4, pp. 2889-2893, May 2003.

A. Roongta, J.-Q. Moon and J. M. Schea, "Reliability-based Hybrid ARQ for Partial-Time Jamming Channels", IEEE MILCOM 2004, Accepted for presentation, pp. 1-7.

D. Divsalar, S. Dolinar and F. Pollara, "Iterative Turbo Decoder Analysis Based on Density Evolution", IEEE Journal on Selected Areas in Communications, vol. 19, No. 5, pp. 891-907, May 2001.

P. Bender, P. Black, M. Grob, R. Padovani, N. Sindhushayana and A. Viterbi, "CDMA/HDR: A Bandwidth-Efficient High-Speed Wireless Data Service for Nomadic Users", IEEE Communications Magazine, vol. 38, No. 7, pp. 70-77, Jul. 2000.

* cited by examiner

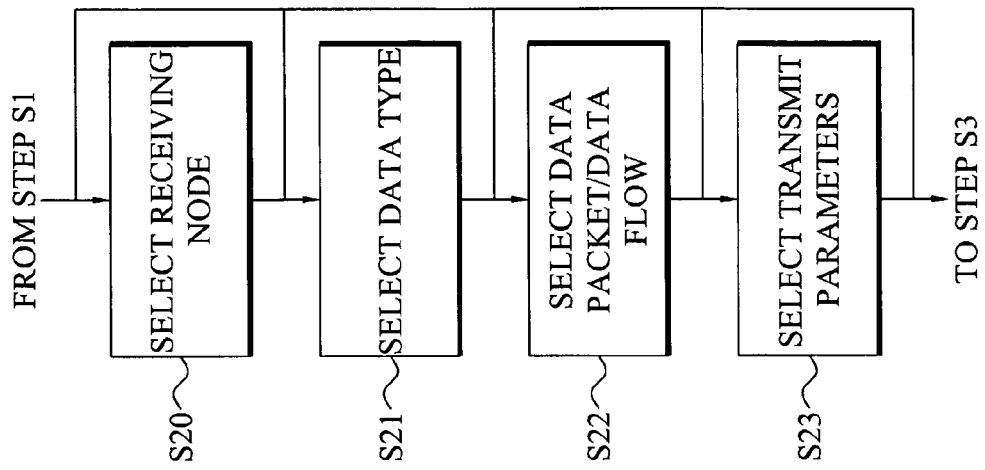
Fig. 3
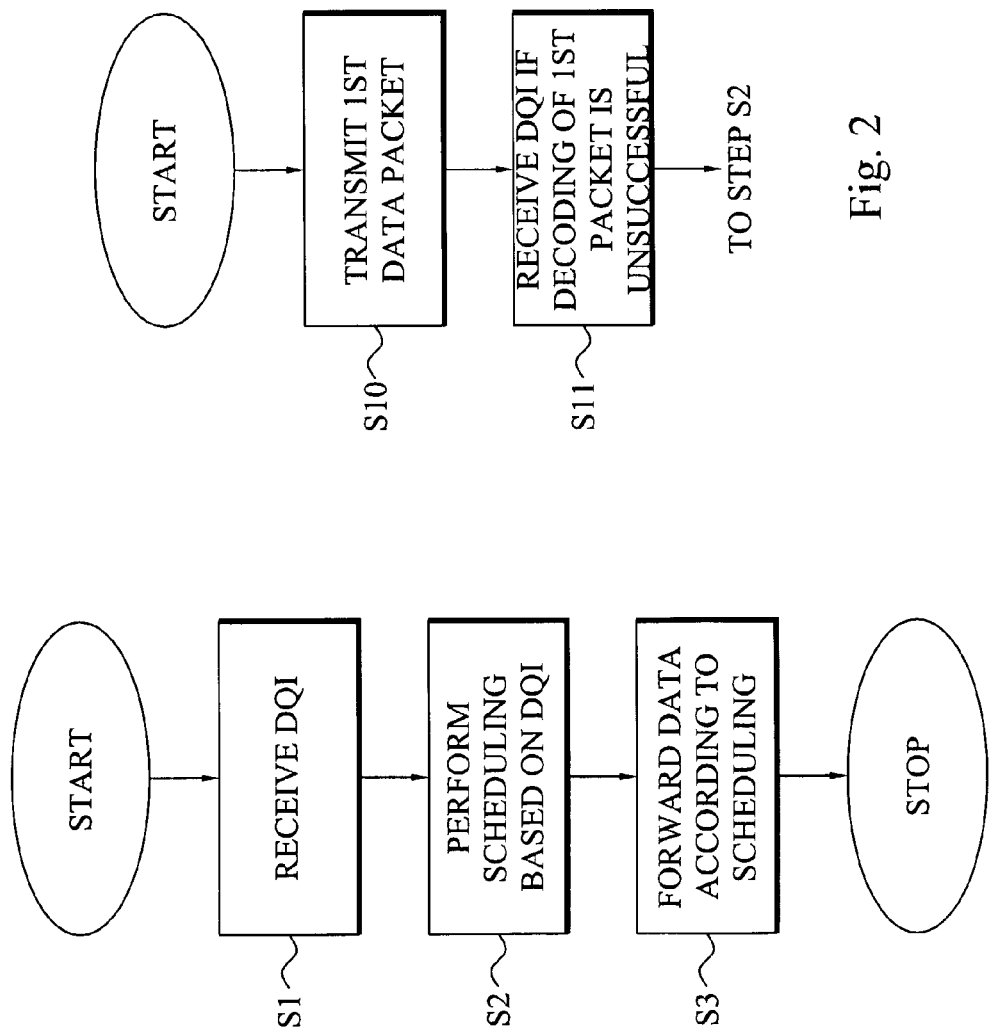
Fig. 2
Fig. 1

QUALITY-BASED DATA SCHEDULING

This application is the U.S. national phase of International Application No. PCT/SE2005/000182 filed 10 Feb. 2005 which designated the U.S. The entire contents of this application is hereby incorporated by reference.

TECHNICAL FIELD

The present invention generally relates to forwarding data packets in communications networks, and in particular to a quality-based scheduling of data packets in such networks.

BACKGROUND

Protocols for sharing a wireless medium effectively among multiple users are generally denoted multiple access protocols, channel access schemes or medium access schemes. Multiple access protocols may be divided into two main categories: conflict-free protocols and contention-based protocols.

Conflict-free protocols ensure that a transmission, whenever made, is successful, i.e. not interfered by other transmissions. Conflict-free transmission can be achieved by allocating the channel to users either statically or dynamically. This is often denoted fixed and dynamic scheduling, respectively. The benefit of the precise coordination among stations is that it is believed to provide high efficiency, but this comes at the expense of complexity and exchange of sometimes large quantities of control traffic.

Contention-based protocols differ in principle from conflict-free protocols in that transmissions have a tendency to be less successful. The protocol should therefore prescribe procedures to resolve conflicts or unsuccessfully transmitted data once they occur so that all messages are eventually transmitted successfully.

A typical example of such a conflict-resolving procedure is requested retransmissions in the form of Automatic Repeat Request (ARQ). In ARQ systems, the receiving node detects whether a received data block or packet includes errors, i.e. whether it can be successfully decoded or not. When errors are detected, a retransmission request, in the form of a Negative Acknowledgement (NACK) identifier, is forwarded to the transmitting node. On the other hand, in response to a successful, i.e. error free, packet reception and decoding, an Acknowledgement (ACK) identifier is returned. As a consequence, error free conditions can be achieved, though, at the cost of long transmission delay times due to the, sometimes many, retransmissions.

An improvement of the (simple) ARQ scheme is the repeated data packet transmission in the form of Hybrid ARQ (HARQ). The HARQ schemes can use the information from a previously erroneous or unsuccessful transmission in order to improve the chances of decoding a following data (re) transmission.

As is known in the art, if a receiving side cannot decode the original data packet correctly, a NACK is typically returned to the transmitting side. If possible, soft values of the original data packet may be stored in a memory at the receiving side. In response to the NACK, the transmitting side will retransmit the data packet (in Chase Combining (CC) HARQ schemes) or transmit incremental redundancy data (in Incremental Redundancy (IR) HARQ schemes). The receiving side can then utilize soft values of the original data block and combine them with soft values of the presently received data packet in order to increase the chances of successful decoding.

In an extension of HARQ, denoted Reliability-Based HARQ (RB-HARQ) [1, 2], the simple NACK is exchanged by information identifying the weakest (most unsuccessfully decoded) bits in the original data packet. As a consequence, the retransmitted data packet only has to include these weakest bits, resulting in smaller retransmission sizes. In a patent application [3], an adaptive HARQ scheme is employed, where the amount of redundancy to transmit in response to a notification of failed decoding is determined based on a quality estimate of an unsuccessfully received data block.

However, although the RB-HARQ schemes [1, 2] and adaptive HARQ scheme [3] reduce the amount of retransmitted data they fail to increase the throughput of wireless communications networks by providing a scheduling of data packets that exploits opportunities, which enable signal transmissions to be more successful than at other times and conditions. Such opportunities will typically arise due to changes or fluctuations within the network over time. An opportune routing [4-6] partly mitigates the rapidly varying link quality in the network by making use of windows of opportunity that these fluctuations provide. Although the existing opportunistic routing schemes [4-6] work well in most situations, they are not particularly suitable for HARQ-based data communication. Thus, there is a general need of providing an efficient opportunistic data packet routing and scheduling scheme adapted for HARQ-based communication.

SUMMARY

The technology disclosed herein overcomes these and other drawbacks of the prior art arrangements.

It is a general object of the technology disclosed herein to provide an efficient mechanism for forwarding data packets in wireless networks.

It is another object of the technology disclosed herein to provide a quality-based scheduling of data packets in wireless networks.

Yet another object of the technology disclosed herein is to provide a packet scheduling that exploits information of previous packet transmissions in the scheduling of subsequent transmissions.

It is a particular object of the technology disclosed herein to provide a quality-based scheduling adapted for multi-hop networks.

It is another particular object of the technology disclosed herein to provide a joint HARQ and (opportunistic) scheduling in multi-hop networks.

Briefly, the technology disclosed herein involves providing quality information associated with unsuccessfully decoded data packets and that represents the degree of decodability of the data packets. This quality information is used by a transmitting node when performing a scheduling for data packet forwarding.

Thus, in one of the aspects of the technology disclosed herein at least one communications node has received at least one data packet in one or more transmissions from one or more transmitting nodes. The communications node processes the data packet(s) in order to try to decode the packet(s). If unsuccessful, the node notifies the transmitting node(s) of the decoding failure. According to the technology disclosed herein, this decoding failure notification includes quality information, denoted Data Quality Indicator (DQI), which represents the degree of decodability of the at least one unsuccessfully decoded data packet at the communications node. The transmitting node then performs a scheduling of subsequent data packets based on this (these) DQI(s). By exploiting this DQI (information of previous transmissions)

in the scheduling, the performance of the network in terms of throughput, latency, capacity and energy/power consumption can be improved.

The DQI-based scheduling can be implemented according to one of multiple example possible embodiments. In a first preferred embodiment, the transmitting node selects, based on the DQI, one or multiple, i.e. at least two, suitable receiving nodes from a set of multiple candidate receiving nodes. In a preferred implementation of this embodiment, the transmitting node selects the receiving node(s) among those candidate receiving nodes that have returned DQI(s). In this embodiment, the quality of the not completely decoded information can be used in the selection of optimal receiving node. The transmitting node could, thus, select one or multiple communications nodes that have a relatively high degree of decodability of a first packet, i.e. only a few weak or non-codable information bits, as receiving node(s). In such a case, only a relative a small amount of information has to be forwarded in a second transmission compared to selecting a communications node having a relative low degree of decodability.

In an alternative embodiment, the transmitting node selects, based on the DQI, a type of data in a data packet to be sent to a communications node, where the data is related to data contained in at least one of the unsuccessfully decoded data packets, based on which the DQI(s) is (are) generated. In a typical implementation, the transmitting node can select, based on the DQI, whether the current data packet will be i) a copy of the previous packet (data re-transmission), ii) include some information bits identical to the previous packet and optionally some incremental bits, iii) include (only) incremental redundancy data. Different such alternatives may be advantageous in different situations as determined by the particular DQI values. Typically, alternative i) is the most suitable choice for a low DQI value (low degree of decodability), whereas alternative iii) could be a good choice for a high DQI value (indicating a relative high degree of decodability of the previous packet).

In yet another embodiment, the transmitting node could select, based on the DQI, a flow among multiple flows represented in the transmitting node. A data packet is then provided based on the selected flow and forwarded to at least one communications node. According to this embodiment, the transmitting node must not necessarily first forward the data packet at the head of line of its transmit queue. For example, the transmitting node could schedule and transmit shorter data packet first. The transmitting node can then use the DQI-measures to estimate the required length of the respective required retransmission and to select the most appropriate data flow and packet.

Any of these embodiments can be combined to form a joint DQI-based selection. In addition, the transmit and/or link parameters employed when forwarding the data packet can be determined, at least partly, based on the DQI. The transmitting node then forwards the selected data (type) to the selected receiving node(s) according to the selected transmit and/or link parameter.

The quality-based scheduling according to the technology disclosed herein can also be based on additional quality information besides DQI. Such additional information includes link quality data (e.g. average and/or instantaneous channel quality), (average) routing cost associated with the transmitting node and/or receiving node(s), Quality of Service (QoS) data associated with the different data flows represented in the transmit queue, queue status, remaining battery power, etc.

It is desirable to select receiving node(s), flow and/or data type and optional transmit/link parameters that are optimal in some sense. In order to be able to speak about optimality in a well-defined manner, an objective function based on DQI-data and optionally, cost progress, link quality and QoS data is preferably introduced and optimized with respect to receiving node, flow and/or data type.

In a preferred example embodiment, the DQI data is not only generated by addressed communications node, but preferably also by communications nodes overhearing the data transmission. In such a case, the transmitting node will obtain DQI data from both addressed (intended) nodes and overhearing (non-intended) nodes, generally providing a larger selection material that is in particular desirable in multi-hop networks.

In addition, a communications node overhearing a DQI reporting between another communications node and a transmitting node, preferably stores this DQI data for later use. Thus, the communications node might subsequently obtain responsibility of forwarding data. If it then has overheard and stored DQI(s) generated based on the decodability of that data at other nodes, it can use this (these) DQI(s) when performing data scheduling by e.g. selecting the most suitable receiving node(s) and/or the most suitable type or format of the data.

Different quality measures can be used as DQIs to represent the degree of decodability of an unsuccessfully decoded data packet at a communications node according to the technology disclosed herein. Generally, these DQI measures should be viewed as a priori knowledge of the amount of information of a data packet that has (previously) been successfully received and processed by the communications node and can, thus, represent the remaining redundancy or effort needed by a transmitting node to successfully transfer and decode the information at the communications node.

The technology disclosed herein offers the following advantages:

Increased network performance and capacity;

Increased throughput and/or reduced delay and latency;

Reduced transmit power consumption for the same performance level as other schemes;

Can be employed for improving efficiency in multi-hop forwarding; and

Can be used as a complement to existing diversity forwarding schemes.

Other advantages offered by the technology disclosed herein will be appreciated upon reading of the below description of the example embodiments.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating a method of forwarding data packets according to the technology disclosed herein;

FIG. 2 is a flow diagram illustrating an embodiment of the DQI receiving step of the packet forwarding method of FIG. 1;

FIG. 3 is a flow diagram illustrating embodiments of the scheduling step of FIG. 1;

DETAILED DESCRIPTION

Figure 4A:
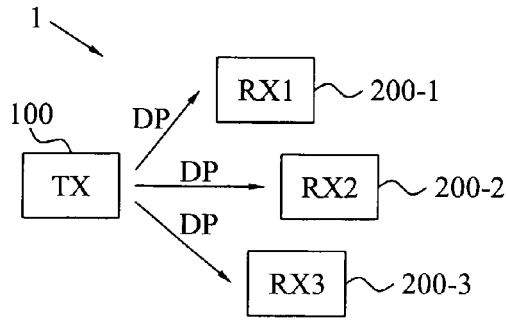
FIGS. 4A-4D illustrate an embodiment of data communication in a communications network according an example embodiment.

Throughout the drawings, the same reference characters will be used for corresponding or similar elements.

The technology disclosed herein relates to quality-based scheduling and/or routing of data packets in wireless communications networks and systems. The technology disclosed herein exploits information of previous data transmissions in the scheduling of subsequent transmissions. The technology disclosed herein is in particular adapted for providing a joint HARQ and (opportunistic) scheduling in such networks.

In an aspect of the technology disclosed herein, at least one communications node has received at least one data packet in one or more transmissions from one or more transmitting nodes. The communications node tries to decode the data packet(s). If unsuccessful, the node notifies the transmitting node(s) of the decoding failure. In the prior art, this notification is typically in the form of a simple NACK. However, the communications node generates quality information associated with at least one non-successfully decoded data packet. This quality information, denoted Data Quality Indicator (DQI) herein, represents the degree of decodability of the at least one unsuccessfully decoded data packet at the communications node. The transmitting node then performs a scheduling of subsequent data packets based on this (these) DQI(s).

The DQI measure could be viewed as a priori knowledge of the amount of information of a data packet that has (previously) been successfully received and processed by the decoder of the communications node. Thus, DQI represents the remaining redundancy or effort needed by a transmitting node to successfully transfer and decode the information at the communications node.

In this aspect, the traditional NACK could be regarded as having been divided into a fine grade scale, where the DQI could be seen as a quality acknowledgement between traditional ACK and NACK. Thus, DQI could schematically be represented by a value between 0 and 1, where a value of 1 represents ACK and successful reception and decoding of a data packet and 0 will then indicate that no information bits of the data packet could be successfully processed, i.e. decoded, (at a required minimum probability) at the receiving node.

In this context, the decodability of an information bit of a received data packet generally requires that a probability estimate of the bit exceeds a minimum required probability threshold. For example, when decoding an information bit, an associated decoding-related probability value is estimated and compared to the threshold. If exceeding the threshold, the bit is considered successfully processed (decoded) and, correspondingly, is deemed unsuccessfully decoded if the estimate is below the threshold. This discussion can be straightforwardly extended to a whole data packet containing multiple information bits. Thus, a data packet is considered successfully decoded if all or at least a minimum portion of its including information bits are successfully decoded.

Different DQI measures can be employed according to the technology disclosed herein depending on e.g. the relevant communications network and coding scheme employed. An example of a measure of decodability that can be used as DQI according to the technology disclosed herein is to estimate the residual amount of information required to decode the full packet, i.e. the difference of information available after decoding and the amount of information contained in the data packet that is processed by the decoder. Furthermore, for a flat AWGN (Additive White Gaussian Noise) channel, signal-to-noise ratio (SNR) is an efficient indication of the quality of reception of a data packet. If trellis coding is used, the accumulated path metric is representative of the reception quality and can be used as DQI measure according to the technology disclosed herein. Correspondingly, in Turbo coding, a posterior probability (APP) values (or a priori, intrinsic and extrinsic information) can be used as indications of how well bits are decoded. The a priori information is the probabilistic knowledge of bits (that can be fed into a decoder for improved decoding performance). The intrinsic information is the soft bit information sent into the decoder and the extrinsic information is the new information that the decoder produces. It has been shown [7] that the Probability Distribution Function (PDF) of the extrinsic information is well represented by a Gaussian-shaped curve, which for each iteration typically improves the mean value (essentially moving the whole Gaussian bell like shape). However, the total information is composed of not just the extrinsic information, but also the intrinsic (the soft bit input from the demodulator) and a priori information of a bit value. The mean (and to some extent also the variance) of the PDF of the total information is an indication of the reliability of the decoded bits. Hence, the DQI measure could e.g. be the mean (and optionally variance of) total information. Another alternative is that the receiver indicates the remaining effort, i.e. the residual required information, instead of the amount of received information. The residual required information is then the difference between the received total information and the required amount of information that allows full decodeability with some probability. Alternatively, the receiver could map the residual required information knowledge to an appropriate HARQ transmission format, which then will be used as DQI measure.

The above-listed parameters should be seen as typical, but non-limiting, examples of suitable DQI measures that can be used according to the technology disclosed herein. Other possible measures could include the percentage of decodable information bits in the packet, i.e. basically implying a value between 0 (0.0) and 100% (1.0). Correspondingly, an indication of weak bits that were not successfully decoded (e.g. by having associated probability estimates that are smaller than the minimum threshold), is regarded as a DQI measure according to the technology disclosed herein.

Generally, any quality measure that represents the degree of decodability of an unsuccessfully decoded data packet at a communications node can be used as DQI measure.

FIG. 1 is a flow diagram illustrating a method of forwarding data packets according to the technology disclosed herein using a quality-based scheduling.

The method starts in step S1, where a transmitting node receives DQI (quality information representing the degree of decodability of an unsuccessfully decoded data packet). The transmitting node can receive one or more DQIs from one or more communications nodes. These DQIs could be associated with the same data packet or different data packets. This (these) data packet(s) could previously have been transmitted by the transmitting node. Alternatively, at least a portion of the DQIs can instead be associated with data packet(s) that has been transmitted by other nodes, which is discussed in more detail below.

In a next step S2, the transmitting node performs a scheduling of data packet forwarding or transmission based on DQI(s). The DQI(s) can be the DQI(s) received in step S1, a portion thereof, and/or DQI(s) previously received and stored in the transmitting node. In either case, DQI-based scheduling preferably exploits the opportunities that system changes and fluctuations provide. By furthermore exploiting information of previous transmissions, through usage of DQI, in the scheduling, the performance of the system in terms of throughput, latency, capacity and energy/power consumption can be improved.

The DQI-based scheduling can be implemented according to one of multiple possible embodiments of the technology disclosed herein discussed in more detail below.

Briefly, the transmitting node can select, based on the DQI, one or multiple, i.e. at least two, suitable receiving nodes. In a preferred embodiment of the technology disclosed herein, the receiving node(s) is (are) preferably selected, based on the DQI, among the communications nodes that have returned DQI(s). However, also, or instead, at least one communications node that has not returned a DQI value could be selected as receiving node, as long as the selection process is based, at least partly, on at least one DQI value. Alternatively, the transmitting node selects, based on the DQI, a type of data in a data packet to be sent to a communications node, where the data is related to data contained in at least one of the unsuccessfully decoded data packets, based on which the DQI(s) is (are) generated. Furthermore, the transmitting node could select, based on the DQI, a flow among multiple flows represented in the transmitting node. A data packet is then provided based on the selected flow and forwarded to at least one communications node.

Any of these embodiments can be combined to form a joint DQI-based selection. In addition, the transmit and/or link parameters employed when forwarding the data packet can be determined, at least partly, based on the DQI.

In a next step S3, the transmitting node forwards a data packet according to the performed DQI-based scheduling. Note that the forwarded data packet preferably carries data that is related to at least a portion of the data contained in at least one of the unsuccessfully decoded data packets, based on which a DQI has been determined. The forwarded data packet could, thus, be a (identical) copy of a previously transmitted unsuccessfully decoded packet. Alternatively, the data packet can carry partly identical bits and partly incremental bits relative the previous transmission. In a further example, the data packet carries only incremental redundancy bits associated with the previous packet.

The method then ends.

The forwarding method of FIG. 1 could be employed as an extension to traditional automatic retransmission request techniques, such as HARQ schemes, with the inventive addition of using received DQI-data for deciding at least one of: i) to whom to send the subsequent data packet, ii) the type of the subsequent data packet and iii) which flow and data packet to first forward.

FIG. 2 is a flow diagram illustrating an embodiment of the receiving step S1 of FIG. 1. In a first step S10, the transmitting node forwards a first data packet destined to at least one communications node. This first data packet could have been generated from a higher layer (application) in the transmitting node or is received from another node in the system. The data packet can be unicast, i.e. addressed and forwarded to a single node, multicast, i.e. addressed and forwarded to multiple nodes, or broadcast, typically forwarded to one or multiple non-addressed nodes. In the latter two cases, this can be done, for example, by forwarding directly without a sensing channel or by using CSMA (carrier Sense Multiple Access) or CSMA/CA (CSMA with Collision Avoidance).

The node(s) process(es) the first data packet in order to try to decode it. If decoding is successful, e.g. as determined by testing through a CRC (Cyclic Redundancy Check) check, the communications node preferably generates and returns an ACK. If not successful, e.g. as determined by the CRC check, the node preferably generates and returns a DQI that reflects the decodability of the first packet at that node in a next step S11.

Correspondingly to the forwarding of the first packet, the communications node can return the DQI by unicasting, multicasting or broadcasting. In particular in the latter two cases, the DQI will or can be received by other nodes besides the transmitting node. It can be advantageous if these other nodes store this DQI information since they can then subsequently use the DQI if they (later) will be responsible for further forwarding the first data packet.

The DQI can be returned in step S11 directly after estimation or determination thereof. Alternatively, the DQI is returned after a pre-defined time period. In a further embodiment, the DQI is not returned to a transmitting node unless a report request is received from the transmitting node. The DQI could instead, or in addition, in particular for a multi-casting or broadcasting implementation, be continuously or periodically transmitted from the communications node.

The DQI measure can be estimated or determined by the relevant communications node. Alternatively, the communications node provides (quality) information and transmits to the transmitting node. This transmitting node can then calculate or at least estimate the DQI from the received quality information. The particular solution to employ depends on where the processing complexity is preferably put and how generic the DQI should be.

Note further that in a preferred embodiment of the technology disclosed herein not only addressed communication nodes generates and transmits DQI. If a communications node overhears the first data packet transmission, it can generate a DQI (if decoding of the overheard packet is unsuccessful) and return to the transmitting node.

This means that a given transmitting node can have access to, e.g. stored in a transmit queue or other storage area, DQI associated with data packets it itself has sent (and are found in the transmit queue) and DQI associated with data packets that other nodes have sent. These other DQI can be used it the transmitting node subsequently will receive and be responsible for further forwarding of the data. It can then use these previously received DQI in the scheduling.

The method then continues to step S2 of FIG. 1.

FIG. 3 is a flow diagram illustrating different embodiments of the DQI-based scheduling of step S2 in FIG. 1.

In a first embodiment, represented by step S20, the transmitting node has obtained DQI from at least one communications node from a set of multiple candidate receiving nodes. It then selects, based on the DQI, a suitable receiving node from this set of candidate nodes to forward a (second) data packet to. Thus, in this selection step S20, the transmitting node can select, based on the reported DQI, a receiving node from the set that has returned a DQI value or has not returned a DQI. The latter case might, for example, be due to that the receiving node has been added to the candidate set after transmission of the previous (first) data packet (e.g. due to that the path loss has changed). It is also possible to select, in step S20 and based on DQI, multiple receiving nodes that have or have not returned DQI data. In a further extension, the transmitting node selects, based on DQI, at least one receiving node that has returned a DQI and at least one receiving node that has not returned a DQI in step S20.

However, in a preferred implementation of this first embodiment, the selected receiving node has reported DQI data to the transmitting node. In a further preferred implementation, the transmitting node has received DQI-data from multiple communications nodes of the candidate set. In step S20, one or multiple receiving nodes are then selected, based on DQI, from those communications nodes of the set that has reported DQIs and optionally a DQI non-reporting node can in addition be selected.

For example, assume that the transmitting node is provided in a multi-hop communications network and is about to forward, through multi-hop transmission, a data packet to a destination node. This data packet has been sent to a first communications node positioned in the direction of the final destination node. A second communications node positioned close to the first node overhears the packet transmission. Assume that both the first and second nodes are unsuccessful in fully decoding the data packet and, thus, returns DQI values to the transmitting node. In this illustrative example, the DQI from the addressed first node is 0.4 (where a value of 1 represents successfully decoded packet and 0 represents totally unsuccessful decoding, i.e. no decodable information bits at all). The corresponding DQI value from the overhearing second node is 0.8. The transmitting node can then select one of these two nodes to re-transmit the data packet to or to transmit related redundancy data to. Since the second node had the ability to successfully process a larger portion of the data packet compared to the first node, typically less data has to be transmitted and less energy is spent if the subsequent data packet is forwarded to the second node instead of the first node.

This should be compared to prior art techniques, where the subsequent data packet would simply be transmitted to the first node, despite the higher degree of decodability in the second node.

As a consequence, the technology disclosed herein is well-adapted for usage in the scheduling and routing in multi-hop networks. In general, the multi-hop approach offers several advantages such as lower power consumption and higher information throughput compared to the direct one-hop approach. In a multi-hop network, nodes out of reach from each other can benefit from intermediately located nodes that can forward messages and packets from the source towards the destination using a routing determined, at least partly, based on DQI measures.

In a second embodiment illustrated in step S21, the transmitting node determines the type of data to send in a current data packet based on DQI associated with a previous packet that contains at least some data related to the data in the current packet. In a typical implementation, the transmitting node can select, based on the DQI, whether the current data packet will be i) a copy of the previous packet (data re-transmission), ii) include some information bits identical to the previous packet and optionally some incremental bits, iii) include (only) incremental redundancy data, iv) some other alternative. Different such alternatives may be advantageous in different situations as determined by the particular DQI values.

For example, assume that a communications node has received a first data packet from a transmitting node. The radio conditions during the data forwarding were very poor so the communications node could only successfully process (at adequate probability) a small portion of the first packet, represented by a DQI value of 0.1. Assume a corresponding situation but with comparatively better radio conditions, so that a major portion of the packet is decodable by the communications node, resulting in a DQI value of e.g. 0.85. Comparing these two example, it might be most efficient to only transmit redundancy data in a second data packet in the situation with an almost completely decodable packet (DQI=0.85), whereas the second data packet would be a copy of the first packet in the case with poor decodability (DQI=0.1). Furthermore, aspects such as average channel quality (e.g. in the form of signal-to-noise and interference ratio (SINR)) or average channel gain may be considered together with the DQI values to make optimal choices. In addition to average channel quality or gain, their instantaneous values may be considered instead or in combination with the respective average value, as is discussed in more detail below.

This discussion can be extended so that the transmitting node is configured for providing the second data packet as a copy of the first packet if $0 \leq DQI \leq \alpha_1$, as comprising a portion of the information bits of the first packet and optionally some incremental bits if $\alpha_1 \leq DQI < \alpha_2$ and as only carrying incremental redundancy if $\alpha_2 \leq DQI < 1$, where $0 < \alpha_1 < \alpha_2 < 1$, $0 < DQI < 1$ and a high DQI value represents a high degree of decodability.

In a third embodiment, illustrated by step S22, the transmitting node maintains a list of destinations/flows currently represented in the node. The DQI-based scheduling provides selection among these different destinations/flows. This, in effect, enables selection of receiving communications node in several general forwarding directions.

For example, assume that the first data in the transmit queue (i.e. the head of line packet of the queue) is associated with a DQI=0.2 received from a first communications node positioned in a first direction relative the transmitting node. This first data is intended to a first destination node in the first direction. The transmit queue also includes second data associated with a DQI=0.9 received from a second communications node and belonging to a second flow. This second node could be positioned in a second general direction between the transmitting node and a second destination node, to which the second data is intended.

Applying prior art techniques, the transmitting node would first transmit a data packet related to the first data since this data is first in the queue. However, scheduling short data packets first is a useful scheduling policy to reduce average queuing latency. According to the technology disclosed herein, it might be most advantageous to first transmit a data packet associated with the second flow, since such a packet could typically be smaller due to the higher associated DQI value. Other scheduling polices than selecting short packets may also be applied, such as optimizing other metrics representative of the progress towards the destination and the amount of effective information transferred.

The DQI-based scheduling according to the technology disclosed herein can, thus, be performed according to the first embodiment above (step S20), the second embodiment (step S21) or the third embodiment (step S22). In a preferred additional embodiment, a joint DQI-based selection is performed, combining the procedures of at least two of the steps S20 to S22. In other words, the transmitting node can select, based on DQI, which node to forward a packet to and what type of data the packet will include (step S20 and S21). Alternatively, the transmitting node selects, based on DQI, a data flow and a receiving node in the direction of the flow (step S20 and S22). Also the steps S21 and S22 can be combined so that the transmitting node selects, based on DQI, a data flow and packet and the type of data this packet should include. A further embodiment of the scheduling step includes, selection of data flow, selection of receiving node in the direction of the flow and selection of data type to forward to the selected receiving node (step S20, S21 and S22), where all of these selections are performed, at least partly, based on DQI. Other (preferred) inputs in the DQI-based selection are average or instantaneous channel quality (or plain path gain). In addition, QoS parameters may be accounted for in the scheduling process, which is discussed further herein.

Any of the above-identified embodiments (single or joint DQI-based selection) can be combined with selecting, based on DQI, of transmit and/or link parameters to use for the data packet forwarding in step S23. The transmit parameters include e.g. the transmit power and the antenna weights used in the data forwarding. Other parameters such as coding and rate or link parameters, including link mode parameters, e.g. data signal constellation and forward error correcting coding, or frequency channel parameters can be adjusted and selected based on obtained DQI values.

For example, assume that two communications nodes return, in response to unsuccessful reception of a first data packet from a transmitting node, a DQI-value of 0.2 and 0.9, respectively. The transmitting node can then adjust, based on the received DQI-values, the transmit parameters to increase the chances of successful communication (re-transmission) between the transmitting node and at least one of the nodes. Thus, a lower transmit power could typically employed when forwarding a second data packet (e.g. re-transmission of first packet) to the communications node with a DQI-value of 0.9 compared to forwarding the packet to the other node.

The transmit parameters can also be adjusted, based on DQI, to maximize overall efficiency, for example by reducing unnecessarily high transmission power levels to reduce energy consumption and other undesirably side effects. The transmit parameters can be set so there is a high probability that the transmission will reach a closest communications node, and also a chance that the transmission will reach one or more nodes further out in the direction of propagation. If one of the further nodes can be reached, there might be fewer hops in a multi-hop journey of the data through the network, which will conserve overall energy expenditures.

The method then continues to step S3 of FIG. 1, where the (selected) data packet comprising the (selected) type of data is transmitted to the (selected) receiving node(s) using the (selected) transmit and/or link parameters.

The technology disclosed herein will now be further illustrated by way of examples, where mainly a DQI-based scheduling in the form of selection of receiving node(s) is described. However, as mention above, other embodiments or combination of embodiments of the scheduling could be used.

FIGS. 4A to 4D illustrate data communication in a multi-hop communications network 1 according to the technology disclosed herein. In FIG. 4A, a transmitting node 100 will transmit a data packet (DP) intended to a destination node through the usage of an intermediate communications node. The transmitting node 100 typically first selects a set of suitable candidate relay or receiving nodes 200-1 to 200-3 positioned in the propagation direction towards the destination node, i.e. these selected nodes 200-1 to 200-3 forms a set of candidate, nodes. The data packet is then forwarded using e.g. broadcasting or multicasting techniques to these candidate nodes 200-1 to 200-3. The advantage in employing a set of multiple candidate nodes 200-1 to 200-3 is that the probability that at least one of the candidate nodes 200-1 to 200-3 successfully receives the data packet generally increases compared to usage of a single candidate node.

Figure 4B:
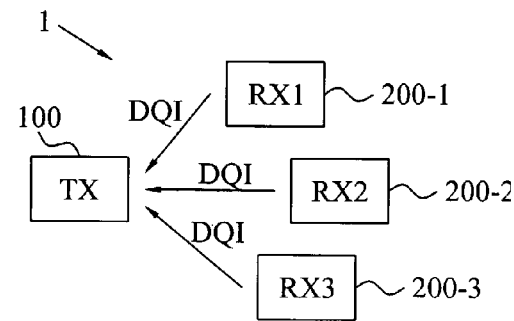

The relay candidate nodes 200-1 to 200-3 try to decode the data packet, e.g. by testing the data through a CRC check. In this example, none of the candidate nodes 200-1 to 200-3 is, however, successful in the decoding of the data packet. Preferably each of the nodes 200-1 to 200-3 generates a DQI or at least information from which the DQI can be estimated, where the DQI indicates the degree of decodability of the data packet at that particular node 200-1 to 200-3. In FIG. 4B, the DQIs are reported to the transmitting node 100, here illustrated by addressed transmissions.

Figure 4C:
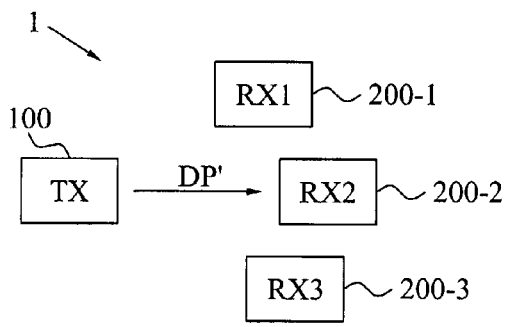
Figure 4D:
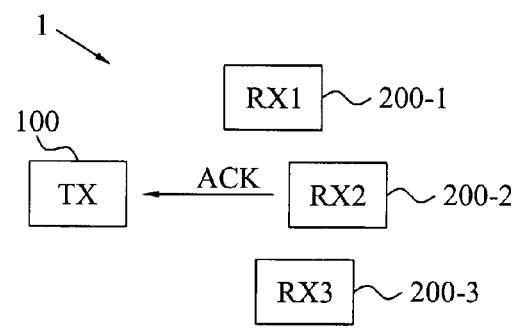

In FIG. 4C, the transmitting node 100 performs a scheduling based on the obtained DQIs. This scheduling could be implemented by selecting the candidate node(s) that returned the largest DQI, i.e. having the highest degree of decodability of the data packet. However, in other embodiments, other parameters, including (instantaneous and/or average) link quality, routing cost, Quality of Service (QoS) data, queue status, remaining battery power, etc., can be used in the scheduling, possibly resulting in that it is more efficient to select one of the non-largest DQI-associated nodes, which is discussed in more detail below. The transmitting node provides a second data packet (DP), possibly based on the DQI. This second data packet preferably comprises data that is related (identical or offers extra redundancy) to the data in the first packet (DP). This second packet is transmitted, possibly using transmit parameter selected based on DQI, to the relay node 200-2 selected based on the DQI.

The relay node 200-2 can then use both the first data packet (DP) (stored soft values of the information bits in the first data packet (DP)) and the second packet (DP) in the decoding process, markedly increasing the chances of successful decoding. In this example, the decoding could be correctly performed and the relay node 200-2 returns an ACK. The transmitting node 100 preferably removes, in response to reception of the ACK, the relevant data, i.e. the first and second packet, from its transmit queue. If the other candidate nodes 200-1, 200-3 overhears this ACK transmission or the ACK is multicast/broadcast, also these nodes 200-1, 200-3 can remove the data packet(s) from their storage. In an alternative embodiment, the data packet(s) are removed after lapse of a pre-defined period of time or upon reception of a discard command.

Figure 5A:
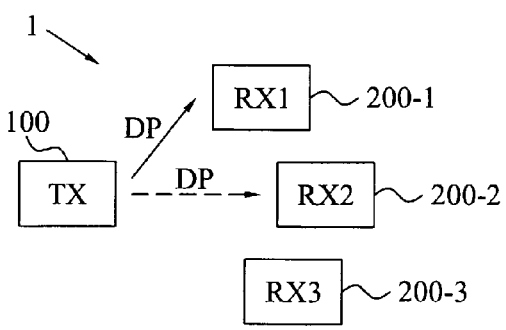
FIGS. 5A-5D illustrate another example embodiment of data communication in a communications network.
Figure 5B:
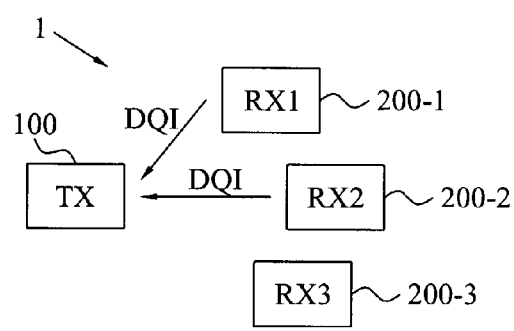
Figure 5C:
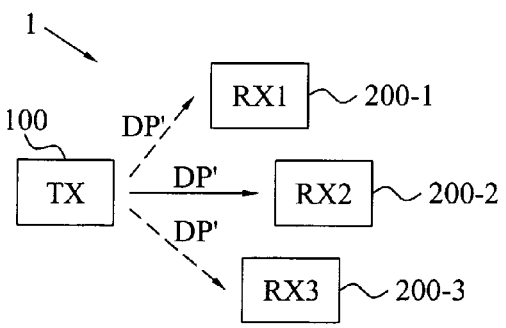
Figure 5D:
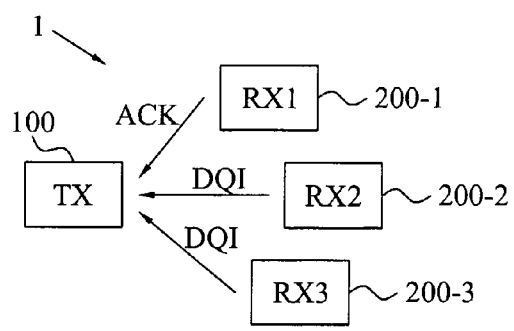

FIGS. 5A to 5D illustrate another example of the DQI-based scheduling and data forwarding in a multi-hop network 1. In FIG. 5A a transmitting node 100 transmits a data packet (DP) to a relay node 200-1. A second relay node 200-2 overhears this initial packet transmission. Both the relay nodes 200-1, 200-2 try to decode the data packet, but are unsuccessful. They generate DQI reflecting their respective degree of decodability of the obtained packet and return them to the transmitting node 100 in FIG. 5B.

The transmitting node selects, based on the two received DQI values, a relay node among the two candidate nodes 200-1, 200-2, which will receive a second data packet (DP) that could be a copy of the first packet or include redundancy data. In this particular example, the overhearing node 200-2 is the selected relay node and the transmitting node 100, thus, forwards the second packet thereto in FIG. 5C. Correspondingly to FIG. 5A, in this second data transmission the relay nodes 200-1, 200-3 overhear the transmission.

All of these relay nodes try to decode the data, the relay nodes 200-1, 200-2 by employing the first (DP) and second (DP) packet and the relay node 200-3 by employing the second packet (DP) only. The relay node 200-1 is successful in the decoding and generates and returns an ACK, whereas the two other nodes 200-2, 200-3 could only process portion of the data and, thus, generate and return DQIs in FIG. 5D.

FIGS. 6A to 6F illustrate still another example of a multi-hop network 1 employing the technology disclosed herein. A transmitting node 100 has data in its transmit queue that it will forward in a multi-hop manner to a destination node. The node 100 provides a set of suitable candidate nodes 200-1, 200-3 that can function as intermediate relay nodes for the multi-hop transmission. A data packet including the relevant data is compiled and transmitted, preferably multicast, to the candidate nodes 200-1, 200-3 in FIG. 6A. Another relay node 200-2, not included in the candidate set, overhears this packet transmission.

Figure 6A:
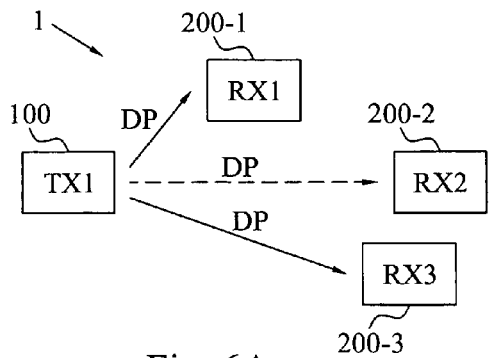
FIGS. 6A-6F illustrate a further example embodiment of data communication in a communications network.
Figure 6B:
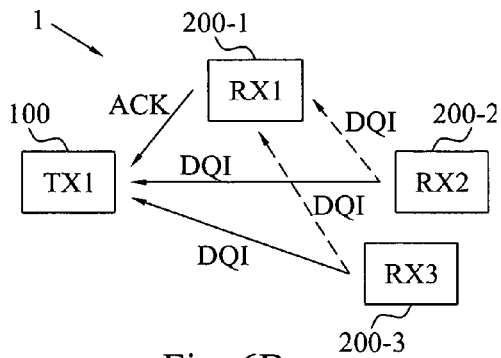
Figure 6C:
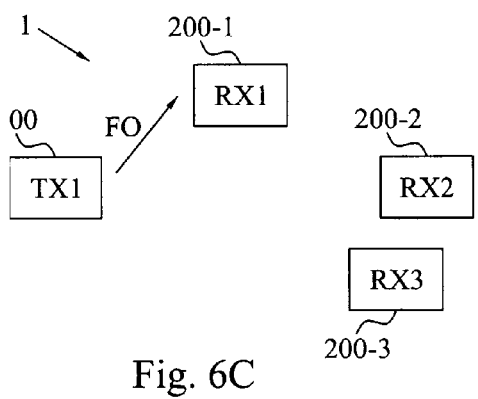
Figure 6D:
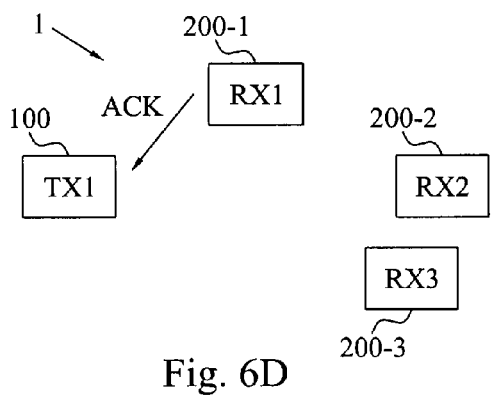

In FIG. 6B, one of the candidate nodes 200-1 succeeded in decoding the data and returns and ACK to the transmitting node 100. The remaining candidate node 200-3 and the overhearing node 200-2 could, however, not completely decode the packet and provides and returns DQIs that reflect their respective degree of decodability. In this example, the transmitted DQIs are overheard by the relay node 200-1, or the DQI could broadcast or multicast. In either case, this relay node 200-1 stores this DQI information in a memory, e.g. in its transmit queue.

Upon reception of the ACK and DQIs, the transmitting node 100 determines that the first relay node 200-1 (due to successful reception of the data) will be responsible for the subsequent forwarding of the data to the destination node. As a consequence, the transmitting node 100 sends a forward order (FO) to the relay node 200-1 in FIG. 6C. In response to this forward order, the relay node returns a forward ACK to the transmitting node in FIG. 6D. The transmitting node 100 can then remove the data from its transmit queue and let go of all responsibility of the data.

Figure 6E:
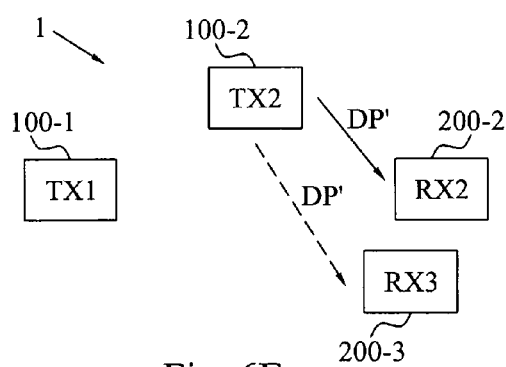
Figure 6F:
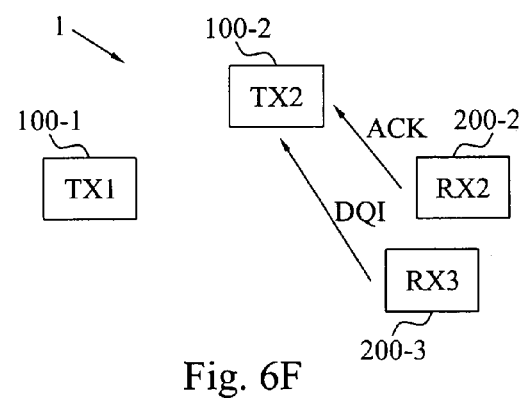

In FIG. 6E the previous relay node (200-1 in FIGS. 6A to 6D) is regarded as a second transmitting node 100-2 since it has the responsibility of forwarding the data towards the final destination. Contrary to the situation in FIG. 6A, this second transmitting node 100-2 has a priori knowledge (DQI) that some of the data has previously been received by the relay nodes 200-2, 200-3. As a consequence, the DQI information can be used when selecting a candidate node among these nodes 200-2, 200-3. In addition, the DQI information can be employed for determining the type of data that will be transmitted to the candidate node. For example, if the DQIs overheard from the relay node 200-2 and 200-3 (see FIG. 6B) have values of 0.9 and 0.4, respectively ($0 \leq DQI < 1$), the transmitting node 100-2 could select, based on the DQIs, only to forward a portion of the original data packet or redundancy data related to the packet previously received by the nodes 200-2, 200-3 in FIG. 6A. As a consequence, less information will have to be sent compared to the prior art situations where the transmitting node 100-2 has no a priori knowledge of the amount of remaining redundancy that is required for successful decoding. The transmitting node provides a data packet (DP') comprising this portion of data or redundancy and transmit to the candidate node 200-2. The other relay node 200-3 overhears this transmission.

Both nodes 200-2, 200-3 try to decode the data preferably using the currently received data (DP') and the previously received data (DP). In this example, the candidate node 200-2 can correctly decode the data, whereas the other node 200-3 is still unsuccessful. As a consequence, an ACK and a DQI are returned to the transmitting node 100-2 in FIG. 6F.

In the examples above, a transmitting node has selected a (single) receiving or candidate node based on DQI values. However, it is anticipated by the technology disclosed herein that multiple suitable receiving or candidate nodes can alternatively be selected based on DQI values.

Figure 7:
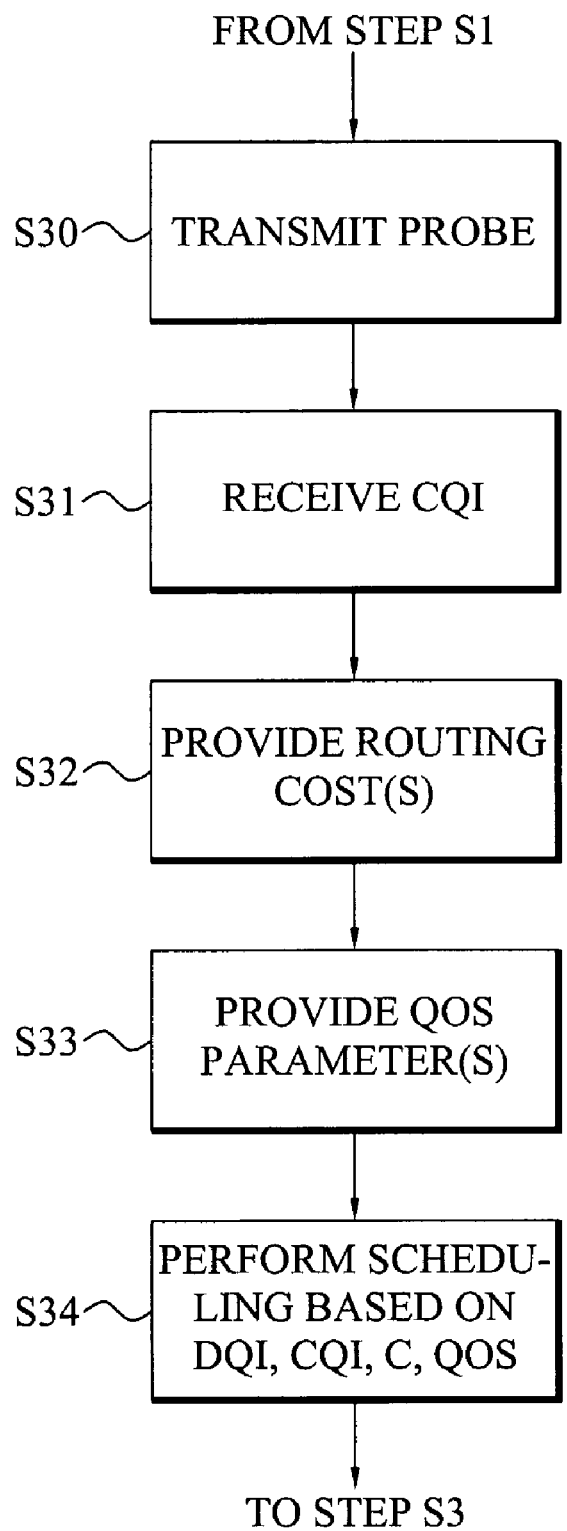
FIG. 7 is a flow diagram illustrating an embodiment of the scheduling step of FIG. 1.

FIG. 7 is a flow diagram illustrating an embodiment of the scheduling step S2 of FIG. 1 in more detail. In this embodiment other data and parameters in addition to DQI are used in the scheduling process. The method continues from step S1 in FIG. 1.

In a next step S30, a transmitting node transmits a channel probe or interrogation message to a number of potential receiving nodes. Information of potential relay or candidate nodes may be derived from earlier derived topology information but may also be influenced by transmit queue content, DQI and QoS factors. This topology and connectivity data can be collected and maintained on a relatively slow basis. This data collection can be a continuous process, for example. Then, when the forwarding procedure is activated, the topology and connectivity data can be used to help the transmitting node determine which nodes that are suitable candidate nodes. The collection rate of topology and connectivity data is ideally i) high enough to provide each node with general indication of which nodes might be suitable candidate nodes for data packets traveling in specific directions or to ultimate destinations, while at the same time ii) low enough to avoid wasting energy and other resources maintaining overhead information. Collection of topology and connectivity data can be provided via traditional routing information protocols, e.g. different Bellman Ford algorithms This interrogation message is used a probe for sensing the current quality of the channels or links between the transmitting node and the relay nodes. Each receiving node estimates its channel or link quality and generates a Channel Quality Indicator (CQI). This CQI could be an estimated SNR or SINR. SINR is preferred in most applications. In opportunistic scheduling, the CQI is often considered to be the instantaneous channel quality, but may also be a measure of the average channel quality over some pre-defined time period. If available, it is typically preferred to use CQI-data that includes both instantaneous and average channel quality. In step S31, the relay nodes send a response message including the CQI. In an alternative embodiment, each candidate node determines which rate that can be used for reception, and then responds with the rate instead, or in addition, in step S31. The rate may be an explicit value or an implicit code for some combination of modulation (QPSK, 8PSK, 16QAM, ... ) and forward error correcting code (convolution coding, Turbo coding, ... ) and encoding rates.

In step S32, the transmitting node can, when using cost progress in some form, provide routing cost information by an independent route determination protocol, such as any well known shortest path protocol (e.g. Bellman Ford or Dijkstra), e.g. using energy, delay or hop metric, or a customized route determination protocol. In this step S32, the transmitting node can provide routing cost associated with itself and/or one or more of the candidate relay nodes.

As is generally known in the art, different flows may have different QoS requirements. By way of example, a flow with strict delay requirements is typically prioritized higher than a flow with more relaxed delay requirements. As a consequence, the transmitting node can provide QoS parameter(s) associated with the data flows or packets represented in its transmit queue in step S33.

In the scheduling step S34, the transmitting node can use any of the above-identified parameters CQI, routing cost, QoS, in addition to the DQI. In most instances, using more decision data and different types of decision data generally results in a more efficient scheduling and routing. As a consequence, the DQI-based scheduling of the technology disclosed herein is advantageously implemented as a scheduling based on DQI-data and at least one of CQI, routing cost and QoS.

The method then continues to step S3 in FIG. 1.

Combined Diversity Scheduling

The quality-based scheduling proposed by the technology disclosed herein can be used together with other opportunistic or multi-user diversity scheduling or communications schemes employed in cellular communications systems, e.g. Wideband. Code Division Multiple Access (WCDMA) systems, such as WCDMA-HSDPA (WCDMA High Speed Downlink Packet Access), or CDMA systems, such as CDMA-HDR (CDMA High Data Rate), [8, 9], or multi-hop networks [4-6].

Figure 8:
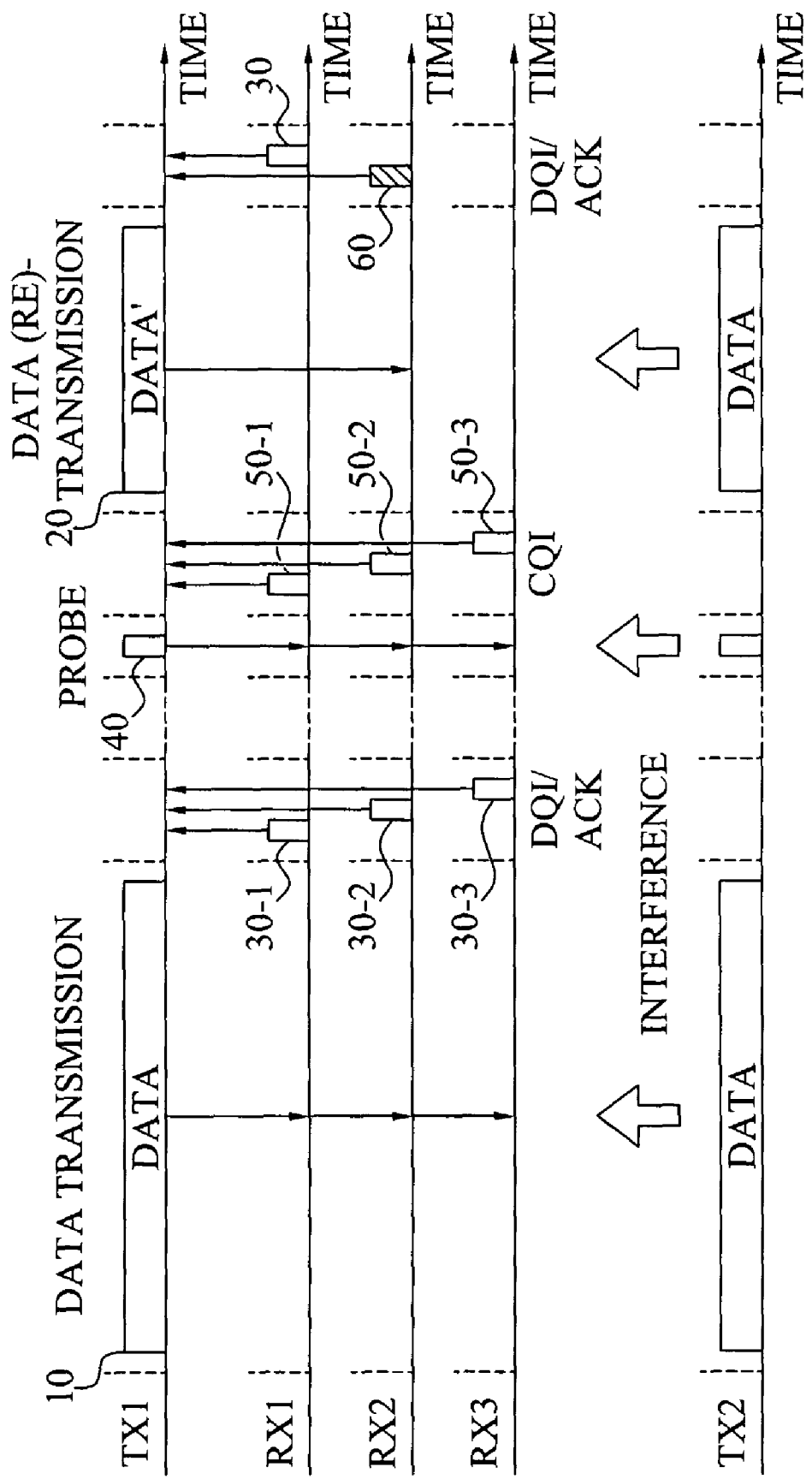
FIG. 8 is a diagram illustrating data communication applicable to multi-user diversity forwarding.

With reference to FIG. 8, the DQI-based opportunistic scheduling of the technology disclosed herein can be combined with a multi-user diversity forwarding (MDF) scheme [5].

A transmitting node TX1 has data in its transmit queue that it will forward to a destination node in a multi-hop manner using intermediate relay nodes in the network. As a consequence, the transmitting node compiles a data packet 10 that contains the relevant data and sends it to potential candidate relay nodes RX1 to RX3, e.g. by broadcasting or multicasting the data packet 10. However, in this example, another transmitting node TX2 also sends data that interference with the packet forwarding. As a consequence, none of the candidate nodes RX1 to RX3 are successful in decoding the received packet 10. Each relay node RX1 to RX3 preferably estimates a DQI 30-1 to 30-3 that reflects the degree of decodability of the packet 10 at that node RX1 to RX3. These DQIs 30-1 to 30-3 could immediately be returned to the transmitting node TX1 after estimation as is illustrated in the figure, or after lapse of a pre-defined time period or at request from the transmitting node TX 1.

In MDF-oriented DQI-based scheduling, the transmitting node also uses CQI measures in addition to DQI data for performing the scheduling. In order to obtain these CQI measures, the transmitting node TX1 generates an interrogation message or probe 40 and transmits it to the potential relay nodes RX1 to RX3. This was preferably also done prior the previous data transmission 10, but has been omitted from FIG. 8 in order to simplify the figure. Each relay node RX1 to RX3 generates a CQI measure 50-1 to 50-3, e.g. by estimating the SNR/SINR, and reports the estimated CQI 50-1 to 50-3 to the corresponding transmitting node TX1.

In order to ensure substantially the same interference conditions during both the interrogation phase and the subsequent data phase, the transmitting nodes TX1, TX2 should preferably transmit their frames in a time-synchronized manner, and substantially the same transmit power level and/or antenna weights should be used during both phases. As is indicated in FIG. 8, the transmitting nodes TX1, TX2 transmit their frames in such a way that the time slots are time-aligned. This provides a basis for the correlation between the interrogation phase and the data phase. In addition, one or more transmit parameters, such as transmit power level and/or antenna weights, are initially determined and preferably based, at least partly, on the previously received DQI data 30-1 to 30-3. These transmit parameters are preferably used both during the interrogation phase and the subsequent data phase so that the CQI 50-1 to 50-3 reported during the interrogation response phase remains the same (or is improved) over the whole data phase.

The transmitting node TX1 performs a scheduling in that e.g. a receiving node is selected among the candidate nodes RX1 to RX3 based on the DQI 30-1 to 30-3 and CQI 50-1 to 50-3 data. Alternatively, or in addition, the transmitting node TX1 can select, based on the DQI 30-1 to 30-3 and CQI 50-1 to 50-3 data, a type of data to send in the subsequent data phase and/or which data flow to first send a packet from. In the illustrative example of FIG. 8, the transmitting node TX1 selects the node RX2 as receiving node and compiles, preferably based on at least the DQI 30-2 and optionally CQI 50-2 data from that node RX2, a second data packet 20 to send to the receiving node RX2.

In this case, the receiving node RX2 can correctly decode the data by employing the previously received first packet 10 and the currently received second packet 20. The node RX2 returns an ACK 60 informing the transmitting node TX1 of the successful reception, allowing the node TX1 to remove the corresponding data from its transmit queue. An overhearing node RX1, catches the second packet 20, but is however unsuccessful in decoding the information correctly and preferably returns a relevant DQI value 30.

Figure 9:
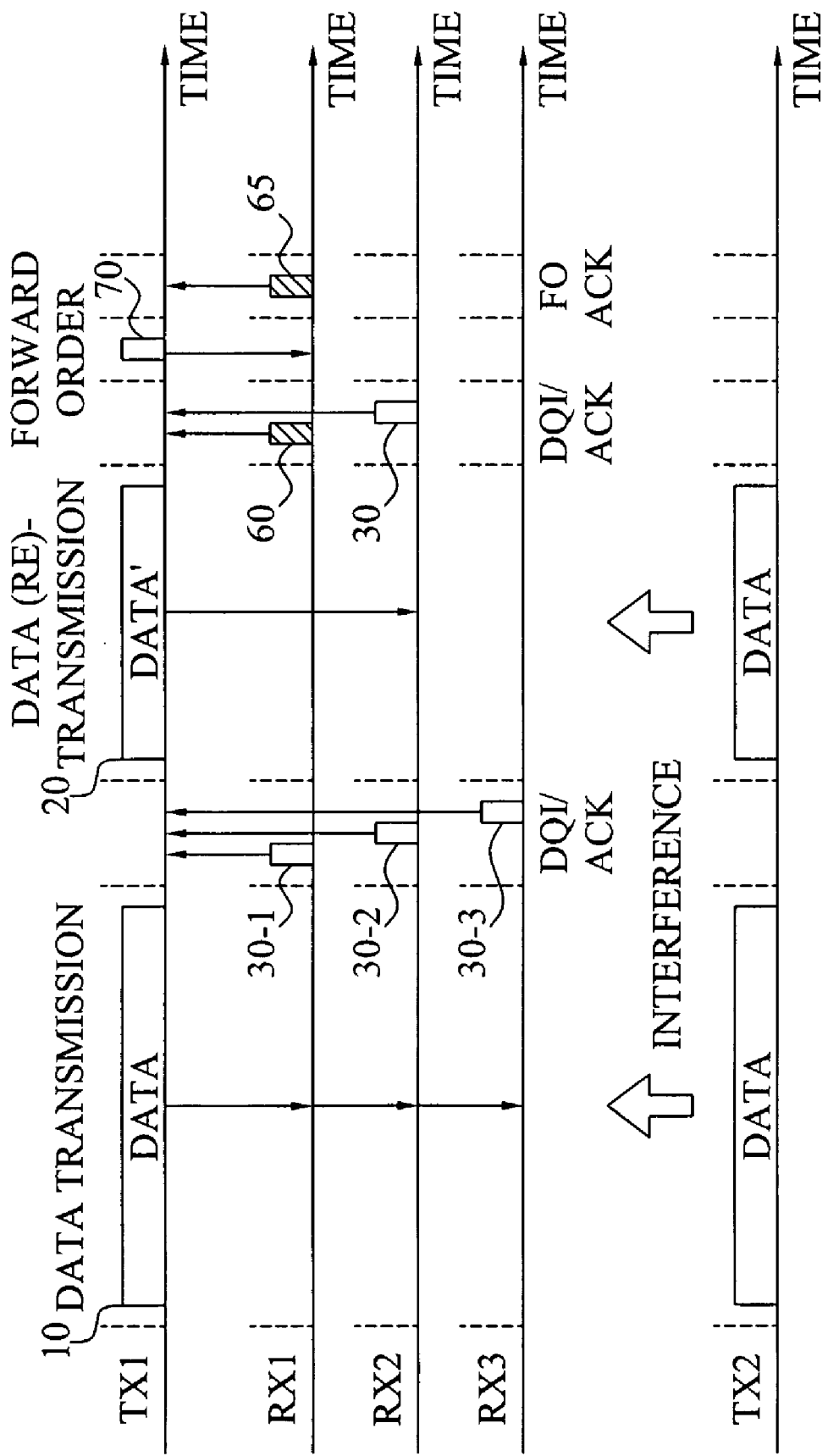
FIG. 9 is a diagram illustrating data communication applicable to selection diversity forwarding.

FIG. 9 illustrates a data signaling example, where the DQI-based opportunistic scheduling of the technology disclosed herein is combined with selection diversity forwarding (SDF) [4]. In this approach, a transmitting node TX1 directs transmission of a data packet 10 to a group of receivers or relay nodes RX1 to RX3 nearby. Correspondingly to FIG. 8, the data transmission of another transmitting node TX1 interferes with the packet forwarding, resulting in defective decoding in the relay nodes RX1 to RX3. These nodes RX1 to RX3 reports the incomplete decoding by estimating and returning DQI data 30-1 to 30-3 according to the technology disclosed herein. The transmitting node TX1 selects at least one of these relay nodes RX1 to RX3 as receiving node RX2 based on the reported DQIs 30-1 to 30-3. A second data packet 20 is communicated to the selected node RX2. However, once again a second transmitting node TX2 interferes with the packet forwarding, and the selected node RX2 is still not able to decode the data, despite the access of both the first 10 and second 20 data packet. One of the other relay nodes RX1 overheard this second packet forwarding and succeeded in correctly decoding the data. As a consequence, the selected node RX2 reports a DQI measure 30, whereas the overhearing node RX1 returns an ACK 60.

Upon reception of the DQI 30 and ACK 60, the transmitting node TX1 transmits a forward order command 70 instructing the relay node RX1 to assume responsibility for forwarding the data further. The relay node RX1 responds by returning a forward order acknowledgement 65. This process is repeated for all subsequent responsible nodes until the information reaches the final destination. Note though, that if e.g. one or more of the nodes RX1 to RX3 could successfully process (decode) the data after reception of the first packet 10, the transmitting node TX1 typically selects one of the successfully decoding nodes and send the forward order to that node.

By following this approach both branch diversity and capture effects can be exploited in the data forwarding process. In particular, branch diversity reduces the need to use interleaved data together with coding to combat fading channels, which in turn means smaller delay and consequently higher throughput. The capture effect refers to a phenomenon in which only the stronger of two signals that are at or near the same frequency is demodulated, while the weaker signal is suppressed and rejected as noise. In conjunction with multiple receiving or relay nodes, the capture effect provides a high degree of robustness when data transmissions collide.

In the scheduling of the technology disclosed herein, it is desirable to select, based on DQI data, receiving node(s), data type and/or data flow and optional transmit and/or link parameters that are optimal in some sense. In order to be able to speak about optimality in a well-defined manner, an objective function f is typically introduced. This objective function f is carefully selected and made dependent on i) some given input parameter and ii) some variables that can be carefully selected to optimize the objective function f.

In the technology disclosed herein, the input parameter includes the quality information representing the degree of decodability of previous unsuccessfully decoded data packets, i.e. DQI data. Other input parameters can also be used, such as routing cost associated with the nodes, CQI data, QoS requirements, queuing status or remaining battery levels.

The optimization variables include receiving node, data type and/or data flow and optional transmit/link parameters. In addition, rate may if desired be included as a variable. Rates are then determined by any appropriate combination of modulation, coding and spreading scheme.

The output from the objective function $f$ includes at least one of i) a selected receiving node(s), ii) a selected data type, iii) a selected data flow or destination. The selection of destination or flow affects which information that is sent. In addition, the optimization of the objective function can also provide an appropriate combination of modulation, coding and spreading, i.e. rate selection, as well as an appropriate set of sub-carriers or frequency channels to be used (i.e. in multi-carrier systems such as Orthogonal Frequency Division Multiplexing (OFDM) or Orthogonal Frequency Division Multiple Access (OFDMA) systems). As a result of the rate selection, a reduction in transmit power is yet another and additional output.

In the following discussion, the technology disclosed herein will further described by way of examples where a joint selection and optimization of best receiving or relay node and best flow, or best node, best flow and most appropriate rate. However, the discussion can with slight modifications be applicable to a single optimization of best relay node, best data type, best flow or a combination of at least two of these objectives, possibly in combination of optimizing transmit/link parameters.

When formalizing an optimization considering relay node and flow, the flowing notations may be used:

V denotes the set of all nodes in the network, or the considered part of the network.

$J_i$ is the set of candidate relay nodes.

$\Phi_i$ is the set of flows in node $v_i$, $v_i \in V$.

The objective function $f$ is then, in this illustrative discussion, optimized for forwarding on behalf of node $v_i$, using input parameters from the above sets $J_i$ and $\Phi_i$ to jointly determine an optimal combination of relay node $\tilde{J}$ and flow $\tilde{\Phi}$:

$$\tilde{J}, \tilde{\Phi} = \arg_{J_i, \Phi_i} \{ \mathrm{opt}_{\{J_i, \Phi_i\}} \{f\} \} \tag{1}$$

where:
$\tilde{J}$ defines the chosen relay node:

$$\tilde{J} = \arg_{J_i} \{ \mathrm{opt}_{\{J_i, \Phi_i\}} \{f\} \} \tag{2}$$

$\tilde{\Phi}$ defines the chosen flow:

$$\tilde{\Phi} = \arg_{\Phi_i} \{ \mathrm{opt}_{\{J_i, \Phi_i\}} \{f\} \} \tag{3}$$

In a first scenario, the only available input parameter is the DQIs and what data packets residue in the transmit queue(s). A scheduling criterion may then be based on an objective function $f$ according to:

$$Z_{ij\phi} = f(DQI_{j\phi}) \tag{4}$$

where $v_i$, $v_i \in V$, is the transmitting node, $v_j$, $v_j \in V$ and $j \in J_i$, is a potential receiving (relay) node and $\phi_i$, $\phi_i \in \Phi_i$, is a flow. $Z_{ij\phi}$ is optimized with respect to $v_j$ and $\phi_i$ according to the equations (1) to (3), i.e. jointly finding the best flow $\tilde{\Phi}$ and the best relay node $\tilde{J}$.

In a specific embodiment, also information about the average cost of communicating from node $v_i$ to node $v_j$ is acquired. As was discussed in the foregoing, a shortest path protocol, like Bellman Ford or Dijkstra, may be used to determine the average routing cost.

$C_i^{(\phi_i)}$ denotes the cost from node $v_i$, $v_i \in V$ to the destination for flow $\phi_i$, $\phi_i \in \Phi_i$. Each flow is associated with a destination.

The objective function $f$ of equation (4) can then be amended according to:

$$Z_{ij\phi} = f(DQI_{j\phi}, C_i^{(\phi_i)}, C_j^{(\phi_i)}) \tag{5}$$

As it is desired that data moves towards the final destination, $C_i^{(\phi_i)} - C_j^{(\phi_i)} > 0$, i.e. assuming monotonically increasing costs from the destination.

While equation (5) is specified per flow, it may likewise be specified per destination. For example, a node $v_i$ may have an associated cost $C_i^{(\phi_d)}$ corresponding to flow $\phi_d$ for a destination node $v_d$. However, if all flows in the node $v_i$ are to be treated equivalent from cost point of view, then $C_i^{(\phi_d)}$ may be replaced by $C_i^{(d)}$. This means that flows heading to the same destination from node $v_i$ sees the same routing cost. Equation (5) can then be re-written as:

$$Z_{ij\phi} = f(DQI_{j\phi}, C_i^{(d)}, C_j^{(d)}) \tag{6}$$

An alternative is that the (instantaneous) link condition, represented by a CQI measure, is known. The scheduling condition could be formulated as maximizing:

$$Z_{ij\phi} = f(DQI_{j\phi}, CQI_{ij}) \tag{7}$$

or more generally considering both the (instantaneous) link condition and the average cost:

$$Z_{ij\phi} = f(DQI_{j\phi}, CQI_{ij}, C_i^{(\phi_i)}, C_j^{(\phi_i)}) \tag{8}$$

A special example of equation (8) is a modified version of the Quality Cost Progress ($Z^{QCP}$). The Quality Cost Progress (QCP) between node $v_i$ and node $v_j$ for flow $\phi_i$ is defined, in the present invention, as:

$$Z_{ij}^{QCP} = f(DQI_{j\phi}, C_i^{(\phi_i)}, C_j^{(\phi_i)}, CQI_{ij}, W_i^{(\phi_i)}) \tag{9}$$

where:
$W_i^{(\phi_i)}$ is weighting parameters for node $v_i$ and for flow $\phi_i$.

The weighting parameters may be any combination of at least fixed prioritization weights, adaptive prioritization weights, QoS-related parameters (such as due time, latency, etc.), fairness criteria and so forth. It may be somewhat more natural and straightforward to incorporate QoS parameters in the optimization when considering flow as an optimization variable, since each flow is normally associated with given QoS requirements.

This allows us to write the optimization (here assumed to be a maximization) of the objective function based on QCP as:

$$Z_{ij}^{QCPmax} = \max_{j \in J_i, \varphi_i \in \Phi_i} \{Z_{ij}^{QCP}\} \quad (10)$$

which results in a combination of relay node and flow. Note that if $Z_{ij}^{QCPmax}$ is negative, no forwarding is executed.

Another special exemplary objective function is based on the Information Cost Progress ($Z^{ICP}$). The following additional notation may be used:

$R_{ij}$ is the set of achievable rates between node $v_i$ and node $v_j$ given the SINR-value $CQI_{ij}$. The rates are constructed by combination of modulation, coding and spreading schemes.

The Information Cost Progress (ICP) between node $v_i$ and node $v_j$ for flow $\phi_i$ using rate $r_{ij}$ is defined, in the present invention, as:

$$Z_{ij}^{ICP} = f(DQI_{j,\phi}, C_i^{(\phi i)}, C_j^{(\phi i)}, r_{ij}, W_i^{(\phi i)}) \quad (11)$$

An optimization of (here assumed to be a maximization) of the objective function based ICP can be formulated as:

$$Z_{ij}^{ICPmax} = \max_{j \in J_i, \varphi_i \in \Phi_i, r_{ij} \in R_{ij}} \{Z_{ij}^{ICP}\} \quad (12)$$

which results in a combination of relay node, flow and a selected rate. Note that if $Z_{ij}^{ICPmax}$ is negative, no forwarding is executed.

In a combination of the MDF scheme and the present invention, a transmitting node $v_i$ tries to find which node to target the transmission to. If we consider a head of line packet for a single flow, a proportional fair scheduling may work as follows.

First assume that the $CQI_{ij}$ between the node $v_i$ and node $v_j$ gives the instantaneous link rate $r_{ij}$ and the (multi-hop) cost metric is based on the inverse average rate for each link:

$$C_{ij} \propto \frac{1}{\bar{r}_{ij}} \quad (13)$$

As has been disclosed herein, the $DQI_{j,\phi}$ (which is specific for each node $v_j$ and for each packet, with the further assumption that the head of line packet is represented by its flow $\phi$) can take on many different formats. In this example, it is suggested that the DQI-parameter takes the form of the additional expected amount of redundancy needed to be able to correctly decode the packet (that was previously received incorrectly). If the length of the original (previous) data packet is $L_{j,\phi}$ and the required retransmission with redundant bits is $L_{j,\phi}^{(red)}$, the effective instantaneous rate $r_{ij}$ will be different for different potential receiving nodes $v_j$.

A scheduling condition can then be to select a node for the head of the line packet belonging to the flow $\phi$:

$$Z_{ij\varphi} = \min_{v_j \in J} \left\{ \begin{array}{ll} \frac{L_{j,\varphi}^{(red)} / L_{j,\varphi}}{r_{ij}} + C_j^{(\varphi)}, & \text{If } C_j^{(\varphi)} < C_i^{(\varphi)} \\ \infty, & \text{Otherwise} \end{array} \right\} \quad (14)$$

For each flow $\phi$, a relay node and a rate is selected:

$$\tilde{v}_{j,\varphi} = \arg_V \{Z_{ij\varphi}\} \quad (15)$$

$$\tilde{r}_{j,\varphi} = \arg_R \{Z_{ij\varphi}\}$$

This metric minimizes the expected transport delay, which alternatively can be interpreted as maximizing the capacity of the network as least possible time resources is used to transport a packet. If, for example, low average delay is important, QoS aspects can be included in equation (14), e.g. by prioritizing flows characterized by short packets or short redundancy packets.

Given the selection of the tentative relay node $\tilde{v}_{j,\phi}$ and rate $\tilde{r}_{j,\phi}$ for each flow, the task is then to select the optimal flow. This can be accomplished by selecting the flow offering the maximum relative rate increase relative the corresponding average rate, i.e. proportional fair scheduling, according to:

$$Z_\varphi = \max_{\varphi \in \Phi_i} \left\{ \frac{\tilde{r}_{j,\varphi}}{\bar{r}_j} \right\} \quad (16)$$

In another alternative embodiment, the ratio between instantaneous channel quality and average channel quality is used as a criterion instead of equation (16). This provides fairness over a SNR range, in contrast to rates that are non-linear with regard to SNR (e.g. consider the log relation in the Shannon capacity relation vs. SNR).

Summarizing equations (14) to (16), the selected relay node, rate and flow are:

$$\tilde{v}_j = \arg_V \{Z_{ij\varphi}\} \quad (17)$$

$$\tilde{r} = \arg_R \{Z_{ij\varphi}\}$$

$$\tilde{\varphi} = \arg_\Phi \{Z_\varphi\}$$

In the previous optimization example, the DQI-parameter took the form of the additional expected amount of redundancy ($L_{j,\phi}^{(red)}$) needed to be able to correctly decode the packet. Generally, the transmitting power could affect this expected amount of redundancy. For example, assume that $L_{j,\phi}^{(red1)}$ redundancy bits are expected to successful decode a packet (re-)transmitted at a power level of $P_{j,\phi}^{(1)}$. Correspondingly, $L_{j,\phi}^{(red2)}$ redundancy bits could be required to successful decode the corresponding information (re-)transmitted at the power level of $P_{j,\phi}^{(2)}$. If $P_{j,\phi}^{(1)} < P_{j,\phi}^{(2)}$, generally, $L_{j,\phi}^{(red1)} > L_{j,\phi}^{(red2)}$. In other words, a lower transmit power can be compensated by transmitting more redundancy data. In most practical implementations, there is a trade-off between the power level to employ and the number of redundancy bits that should be transmitted. Thus, the optimization of the objective function can also regard this power-bit size issue.

Implementation Aspects

Figure 10:
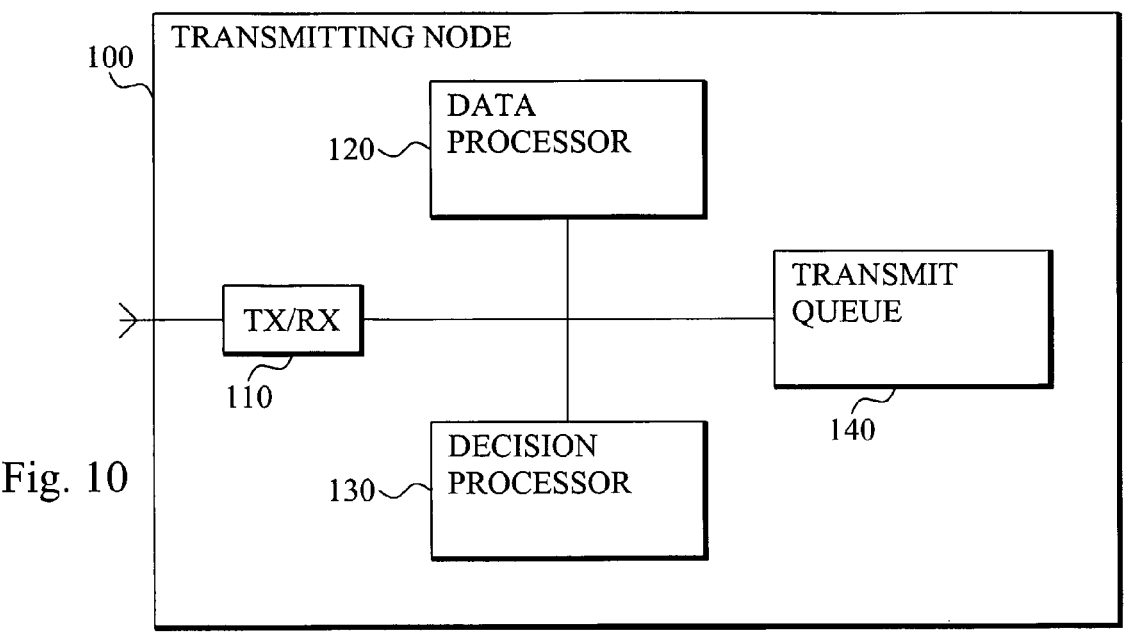
FIG. 10 is a schematic block diagram illustrating an example embodiment of a transmitting node.

FIG. 10 is a schematic block diagram of a transmitting node 100 according to the technology disclosed herein. This node 100 includes means for communication with other nodes in the wireless network, represented by a transmitter/receiver or transceiver 110 in the figure. This transceiver 110 is in particular adapted for transmitting and receiving data packets and other messages, e.g. forward orders and interrogation messages, to and from external nodes, respectively. In addition, the transceiver 110 receives quality data, in the form of DQI and optionally other form of quality data, e.g. CQI and routing cost, from external nodes.

A data processing unit 120 is included in the transmitting node 100 for processing transmitted and received data. This processing unit 120 typically includes coder/decoder and modulator/demodulator functionalities. In addition, this unit 120 could provide different control messages, such as interrogation messages and forward orders discussed herein.

The transmitting node 100 further includes at least one transmit queue or buffer 140 comprising data to be transmitted or forwarded to receiving or relay nodes in the network. This transmit queue 140 preferably also includes DQI-estimates that the transmitting node has received from other nodes. If the DQI-value is associated with, i.e. estimated based on, a data packet that the transmitting node previously has transmitted and, thus, is present in the queue 140, the DQI-value is preferably stored associatively with the packet. The term "associatively storing" is referred to, in the present description, storing the DQI-value in such a way that it is possible to later retrieve the DQI-value based on knowledge of the associated data packet. A typical example of associatively storage is when the DQI-value and the data packet are stored together as a data entry in the queue 140. Furthermore, the DQI-value and the data packet may be stored at different locations within the queue 140 or in two different memories, as long as there is a connection, such as a pointer, between the different storage locations.

The transmitting node 100, preferably, also stores DQI-values that it has received, e.g. due to overhearing, and which are estimated based on data packets that the node 100 has not itself transmitted. The node 100 can then use this DQI-data if it subsequently will be responsible for further forwarding the packet in question.

As was briefly mentioned above, the DQI-data can alternatively be stored in another storage location, e.g. in a dedicated quality parameter memory that, in addition to DQI-data, could store CQI-values, QoS-data and routing cost metrics.

Figure 11:
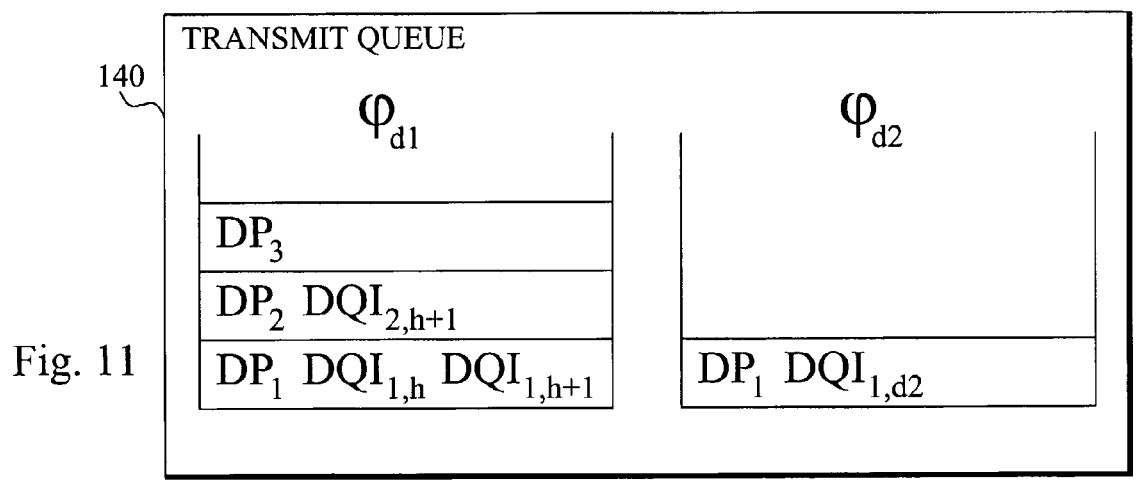
FIG. 11 is a schematic block diagram illustrating a transmit queue of the transmitting node in FIG. 10.

FIG. 11 is a schematic block diagram illustrating a possible implementation of a transmit queue 140. Two data flows $\phi_{d1}$ and $\phi_{d2}$ are represented in this example queue 140. The first flow $\phi_{d1}$ comprises data intended to the destination node $v_{d1}$. In this flow, two data packets $DP_1$, $DP_2$ have already been transmitted to a number of relay nodes $v_h$, $v_{h+1}$ that were unsuccessful in decoding the first packet $DP_1$ of this flow $\phi_{d1}$. These nodes $v_h$, $v_{h+1}$ have, thus, reported quality information $DQI_{1,h}$, $DQI_{1,h+1}$ associated with the first packet $DP_1$ and representative of their respective decodability of that packet $DP_1$. The quality information $DQI_{1,h}$, $DQI_{1,h+1}$ is preferably listed together with the associated data $DP_1$ in the queue as illustrated in FIG. 11. The transmitting node has typically used this received quality information $DQI_{1,h}$, $DQI_{1,h+1}$ when scheduling a re-transmission of this flow $\phi_{d1}$, e.g. by selecting a candidate receiving node $v_{h+1}$ and/or composing a second packet $DP_2$ of this flow $\phi_{d1}$ (selecting type of data contained in the packet $DP_2$).

DQI-data $DQI_{2,h+1}$ associated with this second packet $DP_2$ has been received from one node $v_{h+1}$ and is found in the queue 140. A third packet $DP_3$ has recently been composed for this data but has not yet been transmitted to a relay node, or no DQI thereof has yet been received.

Correspondingly, a second flow $\phi_{d2}$ comprises data intended to the destination node $v_{d2}$. A first packet $DP_1$ of this flow $\phi_{d2}$ has been sent to the destination node $v_{d2}$ and $DQI_{1,d2}$ has been received from that node $v_{d2}$ and entered in the transmit queue 140. This DQI-data can then be used by the transmitting node when it will provide a second packet of this flow $\phi_{d2}$, e.g. by selecting between identical bits and redundant bits.

As can be seen in FIG. 11 and derived from the discussion above, some of the data in the transmit queue 140 will have DQI(s) associated therewith, whereas some data does not have any DQI at all (either due to that they have not been sent, or no DQIs were reported). In addition to the DQI, a record could keep track on how many times the corresponding data has been sent and which HARQ format (e.g. CC, Partial IR (PIR) or Full IR (FIR)) that has been used.

Returning to FIG. 10, the transmitting node 100 also includes a decision processor or selecting means 130 that performs the quality-based (DQI-based) data scheduling and/or routing according to the technology disclosed herein. In a first embodiment, this decision processor 130 is configured for selecting at least one receiving node among multiple candidate nodes based on DQI(s). The relevant DQI(s) used by the processor 130 can have been received in one or more different report occasions. In further embodiments, the processor 130 selects, based on DQI, the type of data that a data packet will contain and/or which data flow and data packet represented in the transmit queue 140 that should first be selected and forwarded. Combinations of these embodiments and possibly together with DQI-based selection of transmit and/or link parameters are also within the scope of the technology disclosed herein.

The decision processor 130 could also use other quality data, such as CQI measures, routing cost metrics and/or QoS data, in addition to DQI in the scheduling and selection process.

In a preferred embodiment of the technology disclosed herein, the decision processor 130 is configured for performing the DQI-based scheduling by optimizing an objective function that comprises the DQI, and optionally CQI, routing cost, QoS data, as input parameter.

The units 110, 120 and 130 of the transmitting node 100 may be provided as software, hardware or a combination thereof. The transmitting node 100 may in turn be arranged or provided in a wireless communications network or system, including both cellular systems and multi-hop systems.

Figure 12:
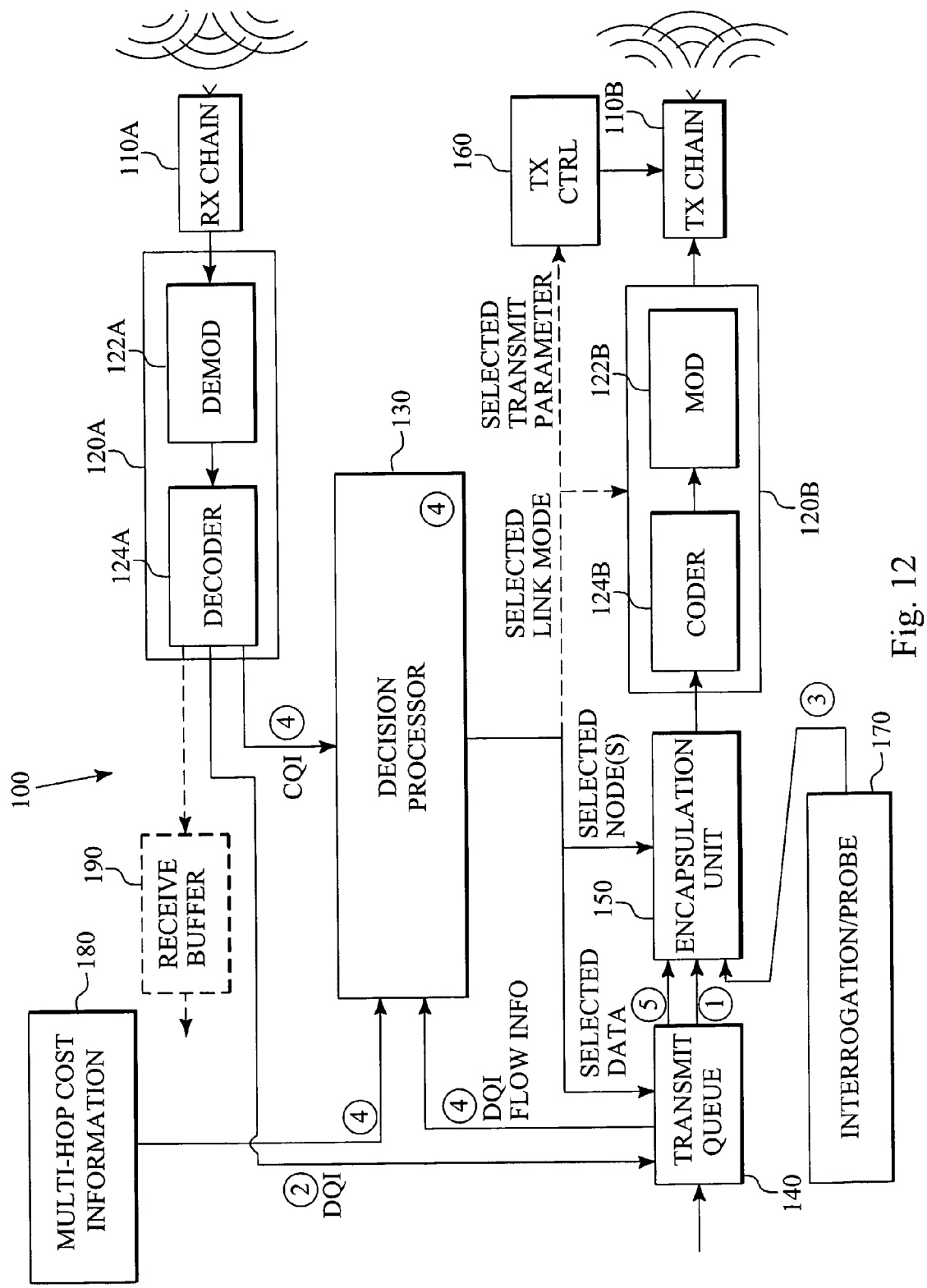
FIG. 12 is a block diagram illustrating another example embodiment of a transmitting node.

FIG. 12 is a schematic block diagram of another embodiment or a transmitting node 100 according to the technology disclosed herein. The transmitting node 100 of FIG. 12 basically comprises a conventional receiver chain 110A connected to an antenna or antenna system, a conventional transmission chain 110B (with associated antenna/antenna system), a demodulation and decoder unit 120A, a coder and modulation unit 120B, a unit 130 for performing a DQI-based decision process to select data type, relay node, data flow and optional link mode and transmit parameter, a transmit buffer 140, an encapsulation unit 150, a transmit parameter controller 160, an interrogation/probe unit 170, a unit 180 for providing multi-hop cost information and a receive buffer 190.

In the first round (1), a data packet is fetched from the transmit queue 140 and is provided to the encapsulation unit 130 for encapsulation and (explicit and/or implicit) addressing. From an addressing perspective, the transmitting node 100 could employ unicasting, multicasting or broadcasting to transmit the data packet. The encapsulated data packet is transferred to the coder and modulation unit 120B for coding 124B and modulation 122B, and further on to the transmission chain 110B for transmission towards the relay candidate node(s). The transmit power level and/or antenna weights used for transmission are given by the transmit parameter controller 160.

In the second round (2), the transmitting node 100 receives, response messages from a number of relay candidate nodes via the receiver chain 110A and the unit 120A for demodulation 122A and decoding 124A. The response messages, which are ACKs and/or DQIs, are then typically transferred to the decision unit 130 and/or to the transmit queue 140. Upon reception of the ACKs/DQIs, the decision processor 130 will perform the DQI-based scheduling according to the technology disclosed herein.

However, if further quality parameters are to be used in the scheduling and selection process, the DQIs could first be stored in the transmit queue 140 until such other parameters have been provided to the decision processor 130.

In the current example, the decision processor 130 will use, in addition to DQIs, cost metrics and CQI data. As a consequence, an interrogation message should be provided and transmitted to the candidate nodes.

Thus, an interrogation probe is transferred, in a third round (3), from the unit 170 to the encapsulation unit 130 for encapsulation and (explicit and/or implicit) addressing. The transmitting node 100 typically employs broadcasting or multicasting to transmit the interrogation message to selected relay candidate node(s) in the network. The relay candidate node(s) may for instance be selected by a general controller (not illustrated) based on multi-hop cost information obtained from an underlying route determination protocol 180, perhaps together with additional information, e.g. DQIs. The encapsulated interrogation probe is transferred to the coder and modulation unit 120B and further on to the transmission chain 110B for transmission towards the relay candidate node(s). The transmit power level and/or antenna weights used for transmission are given by the transmit parameter controller 160. In this case, the decision processor 130 could have informed the controller 160 of suitable transmit parameters, which have been produced based on the received DQI data.

In the fourth round (4), the transmitting node 100 receives response messages from a number of relay candidate nodes via the receiver chain 110A and the unit 120A for demodulation 122A and decoding 124A. The response messages are then transferred to the decision unit 130. In addition, the relevant DQI data is fetched from the transmit queue 140 or from some other (temporary) storage and input to the decision processor 130. Preferably also information on which destinations/flows that are represented in the node 100 as well as multi-hop cost information from an underlying route determination protocol 180, such as Bellman-Ford or similar protocol, are input to the processor 130. In the transmitting node 100, such cost information is preferably gathered and/or generated in the multi-hop cost information unit 180, which is connected to the decision unit 130. Information on selectable destinations and/or flows can be retrieved, e.g. by investigating the transmit queue 140 or by maintaining a separate list of destinations/flows currently present in the node 100.

The decision processor 130 then selects at least one of data type, relay node, data flow (and data packet) and optionally also link mode and transmit parameter for transmission in a decision process. Preferably, the decision unit 130 performs a joint selection of at least two of the above-identified objects. This (joint) selection can be performed by optimization of an objective function based on the DQI-data and optionally cost progress and link performance information (CQI), as previously described in detail.

In a fifth round (5), the selected data (type) is then transferred from the transmit queue 140 to the encapsulation unit 150, which encapsulates the data and sets the address to the selected relay node(s). The encapsulated packet information is then transferred to the coder and modulation unit 120B, which performs coding and modulation according to the selected link mode before the packet information is transmitted to the selected relay node(s) using the selected transmit parameter.

The units 110-130 and 150-180 of the transmitting node 100 may be provided as software, hardware or a combination thereof.

Figure 13:
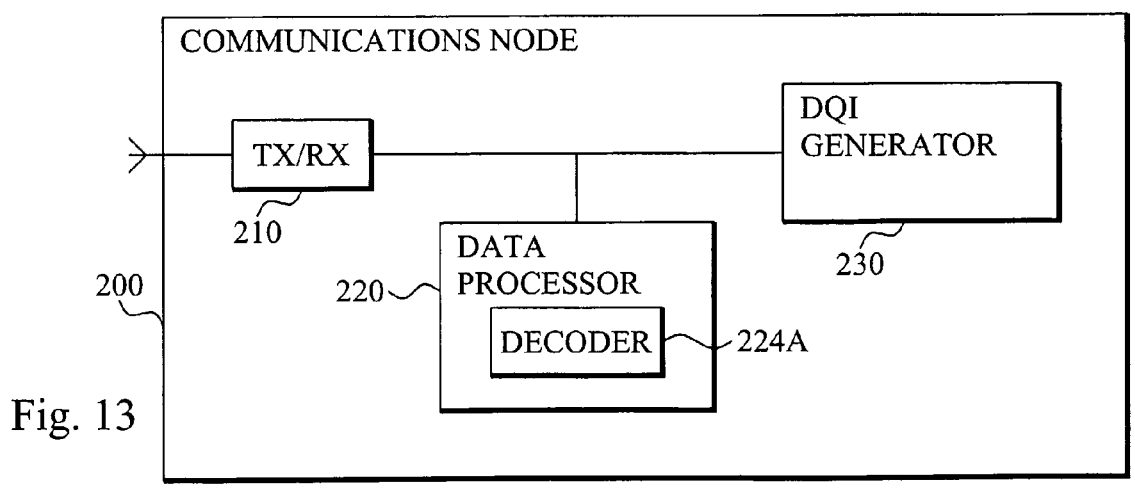
FIG. 13 is a schematic block diagram illustrating an example embodiment of a communications node.

FIG. 13 is a schematic block diagram of a communications (relay) node 200 according to the technology disclosed herein. This node 200 includes means for communication with other nodes in the wireless network, represented by a transmitter/receiver or transceiver 210 in the figure. This transceiver 210 is in particular adapted for transmitting and receiving data packets and other messages to and from external nodes, respectively. In addition, the transceiver 210 transmits quality data, in the form of DQI and optionally other form of quality data, e.g. CQI and routing cost, to external nodes.

A data processing unit 220 is included in the communications node 200 for processing transmitted and received data. This processing unit 220 typically includes coder and decoder 224A and modulator/demodulator functionalities. In addition, this unit 220 could provide different control messages, such as ACK and forward ACK messages discussed herein.

The communications node 200 further includes a DQI generator 230 that is preferably connected to or at least in communication with the decoder unit 224A of the data processor 220. This generator 230 estimates the degree of decodability of a data packet not successfully decoded by the decoder 224A. This degree of decodability could be represented by a number between 0 and 1, representing an estimate of the percentage of a data packet or block that could be processed (decoded). Alternatively, the degree of decodability could be an estimate of the remaining redundancy required to successfully decode the unsuccessfully decoded data packet or some other of the previously discussed possible DQI measures. Instead of providing a DQI measure, this generator 230 could be configured for generating quality information, from which the DQI measure can be derived. In either case, the DQI measure or quality information is provided to the transceiver 210 for reporting (unicast, multicast or broadcast) to a transmitting node.

The DQI generator 230 is preferably configured for estimating DQI values also of data packets that the transceiver 210 overhears, i.e. data packets originally intended other communications node(s).

The units 210 to 230 of the communications node 200 may be provided as software, hardware or a combination thereof. The communications node 200 may in turn be arranged or provided in a wireless communications network or system, including both cellular systems and multi-hop systems.

Figure 14:
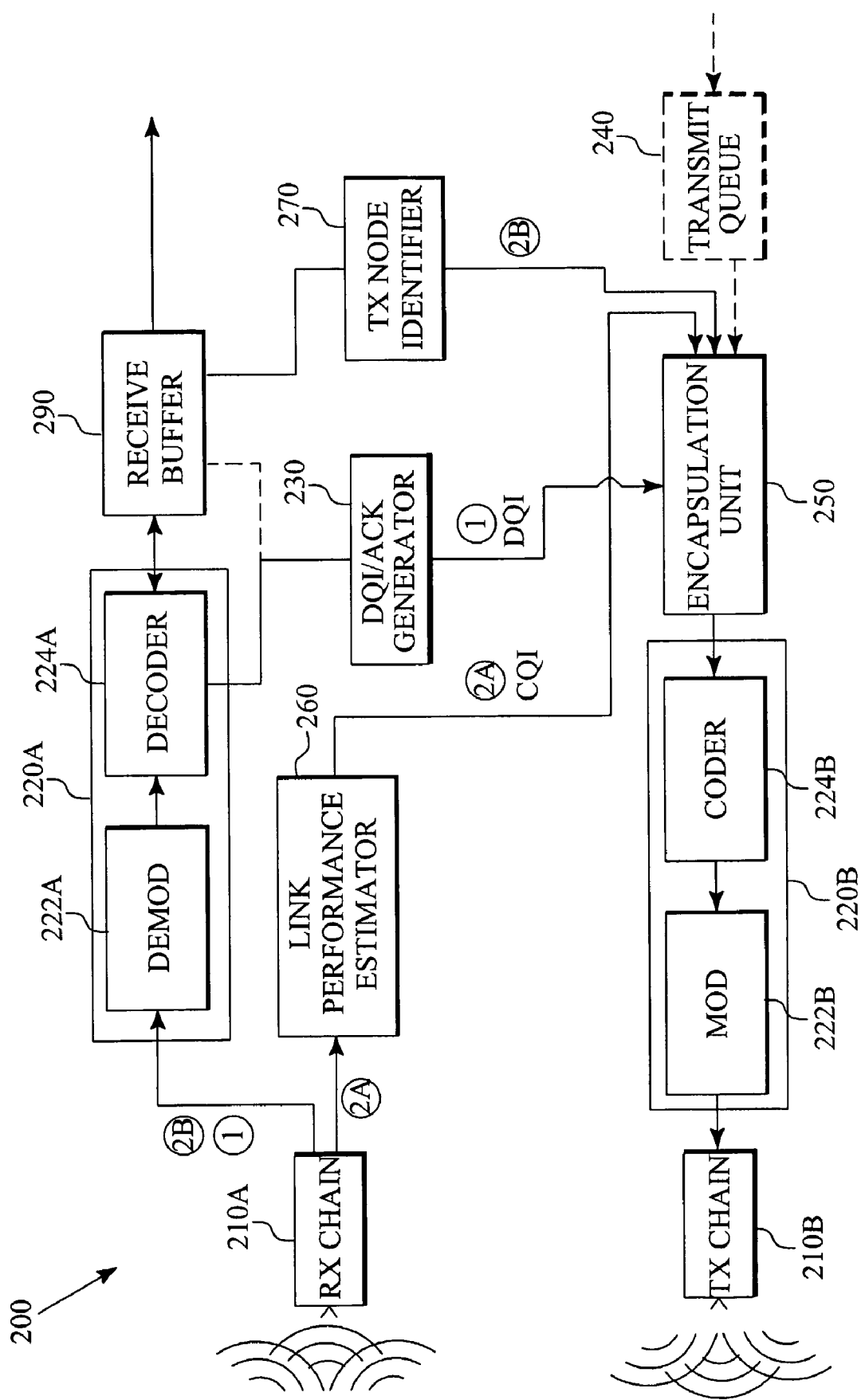
FIG. 14 is a block diagram illustrating another example embodiment of a communications node.

FIG. 14 is a schematic block diagram of relevant parts on the receiver side (receiving communications node 200) according to an exemplary embodiment of the technology disclosed herein. The relay node 200 of FIG. 14 basically comprises a conventional receiver chain 210A connected to an antenna or antenna system, a conventional transmitter chain 210B (with associated antenna/antenna system), a unit 220A for demodulation 222A and decoding 224A, a unit 220B for modulation 222B and coding 224B, a DQI generator 230, a transmit queue 240, an encapsulation unit 250, a link performance estimator 260, a transmit node identifier unit 260, and a receive buffer 290.

The relay candidate node 200 receives, in round (1), a data packet from one or more transmitting node in the wireless network through the receiver chain 210A. The data packet is provided to the demodulator 222A and decoder 224A, which try to demodulate and decode the packet. If successful, the DQI/ACK generator 230 or a separate acknowledgement unit composes an ACK message and returns to the relevant transmitting node through the encapsulation 250 and coding/modulating 220B units and transmitter chain 210B.

If the decoder 224A, however, is not able to successfully decode the packet, information representing the degree of decodability or the unsuccessfully decoded packet itself is provided to the DQI generator 230 for generation of a DQI estimate. In addition, the unsuccessfully packet or data related thereto, e.g. APP values or other soft information, are stored in the receive buffer 290.

The DQI estimate from the DQI generator 230 is provided to the encapsulation unit 250 for encapsulation and addressing (the relevant address can be obtained from the transmit node identifier 270). The encapsulated DQI information is then transmitted (unicast, multicast or broadcast) to the relevant transmitting node by using the unit 220B for coding 224B and modulation 222B, as well as the transmission chain 210B.

In this illustrative embodiment, the transmitting node answers by transmitting an interrogation message that is captured by the receiver chain 210. In round (2A), the link performance estimator 260 estimates a link performance measure CQI, such as SNR/SINR (or alternatively transforms the SNR/SINR value into a supported rate) for transmission back to the interrogating node in a response message. The estimate is transferred to the encapsulation unit 250 for encapsulation and addressing. The encapsulated response information is then transmitted to the interrogating transmit node by using the unit 220B for coding 224B and modulation 222B, as well as the transmission chain 210B.

If the transmitter address is included in the interrogation message, the message is also transferred, in round (2B), via the unit 220A for demodulation 222A and decoding 224A to the receive buffer 290. The transmit node identifier unit 270 investigates the received interrogation message and extracts the transmitter address for transfer to the encapsulation unit 250. The transmitter address can then be used by the encapsulation unit 250 so that the response message reaches the interrogating transmit node.

If the relay candidate node 200 is selected by the interrogating transmit node, based on the reported DQI and preferably the reported CQI, the relay node 200 typically receives a second data packet from the transmit node through the receiver chain 21A. This second packet is processed in a similar manner as for the first packet in round (1). However, in this case the decoder 224A can use both this received data and the corresponding previously received data found in the receive buffer 290 in order to increase the chances of successful decoding. If still not able to decode the data, a second DQI, now based on the degree of decodability of the combined data of the first and second packet is generated by the DQI generator 230 and returned to the transmitting node. Correspondingly, a correctly decoded data triggers provision and reporting of an ACK.

The data packet in the receive buffer 290 may subsequently be transferred to the transmit queue 240 for later transmission to relay candidate nodes further on in the multi-hop network. Alternatively, the fully decoded packet is provided to an application (not illustrated) in the node (200).

The units 210-230 and 250-270 of the communications node 200 may be provided as software, hardware or a combination thereof.

It will be understood by a person skilled in the art that various modifications and changes may be made to the present invention without departure from the scope thereof, which is defined by the appended claims.

REFERENCES

[1] A. Roongta and J. M. Shea, "Reliability-based Hybrid ARQ using Convolutional codes", *Proc.* 2003 *IEEE Intl. Conf on Commun.*, Vol. 4, pp. 2889-2893, May 2003
[2] A. Roongta, J.-Q. Moon and J. M. Schea, "Reliability-based Hybrid ARQ for Partial-Time Jamming Channels", *IEEE MILCOM* 2004, Accepted for presentation, pp. 1-7
[3] International application WO 00/21236
[4] International application WO 02/35779
[5] International application WO 2004/091155
[6] International application WO 2004/091154
[7] D. Divsalar, S. Dolinar and F. Pollara, "Iterative Turbo Decoder Analysis Based on Density Evolution", *IEEE Journal on Selected Areas in Communications*, Vol. 19, No. 5, pp. 891-907, May 2001
[8] U.S. Pat. No. 6,449,490
[9] P. Bender, P. Black, M. Grob, R. Padovani, N. Sindhushayana and A. Viterbi, "CDMA/HDR: A Bandwidth-Efficient High-Speed Wireless Data Service for Nomadic Users", *IEEE Communications Magazine*, Vol. 38, No. 7, pp. 70-77, July 2000

The invention claimed is:

1. A method of operating a transmitting node of a wireless network, the method comprising:
transmitting data packets in the wireless network to a set of multiple receiving nodes;
receiving quality information associated with at least one unsuccessfully decoded data packet from at least one node of the set, the quality information representing a degree of decodability on a per packet basis of the at least one unsuccessfully decoded data packet at the at least one node, an unsuccessfully decoded data packet comprising one or more information bits having probability estimates which do not exceed a minimum required probability threshold;
using the quality information both:
to select at least one receiving node from said set of multiple candidate receiving nodes to which to transmit a forwarded packet, the forwarded packet comprising at least a portion of the data contained in the at least one unsuccessfully decoded data packet; and
to determine an amount of redundancy data to include in the forwarded packet; and
forwarding the forwarded packet to the selected at least one receiving node.

2. The method according to claim 1, wherein said at least one unsuccessfully decoded data packet has previously been forwarded by said transmitting node.

3. The method according to claim 2, wherein said quality information represents remaining redundancy required to successfully decode said at least one unsuccessfully decoded data packet.

4. The method according to claim 1, wherein the act of selecting the at least one receiving node is performed based on optimization of an objective function that comprises said quality information.

5. The method of claim 1, further comprising receiving the quality information associated with at least one unsuccessfully decoded data packet from plural nodes of the set, with the quality information received from each of the plural nodes respectively representing the degree of decodability of the at least one unsuccessfully decoded data packet at the respective plural nodes.

6. The method of claim 1, further comprising using the quality information to select at least one transmit or link parameter, and forwarding the forwarded data packet using the selected at least one transmit or link parameter.

7. The method of claim 1, further comprising:
using the quality information to select a flow among multiple flows represented in the transmitting node;
obtaining the forwarded data packet from a transmit queue of the transmitting node based on the selected flow.

8. The method of claim 1, further comprising selecting the at least one receiving node from said set of multiple candidate receiving nodes based on the quality information and at least one of:
information representing link performance between the transmitting node and the at least one node;
routing cost associated with at least one of said transmitting node and the at least one node; and
at least one quality of service parameter.

9. The method of claim 1, wherein the quality information comprises at least one of:
a posterior probability values which indicate how well bits are decoded for the at least one unsuccessfully decoded data packet;
a percentage of decodable information bits in the at least one unsuccessfully decoded data packet.

10. A method of operating a wireless network comprising a transmitting node and a set of multiple receiving nodes, the method comprising:
transmitting data packets from the transmitting node to the set of receiving nodes;
receiving quality information associated with at least one unsuccessfully decoded data packet from at least one node of the set, the quality information representing a degree of decodability on a per packet basis of the at least one unsuccessfully decoded data packet at the at least one node, an unsuccessfully decoded data packet comprising one or more information bits having probability estimates which do not exceed a minimum required probability threshold;
at the transmitting node, using the quality information both:
to select at least one receiving node from said set of multiple candidate receiving nodes to which to transmit a forwarded packet, the forwarded packet comprising at least a portion of the data contained in the at least one unsuccessfully decoded data packet; and
to determine an amount of redundancy data to include in the forwarded packet;
forwarding the forwarded packet from the transmitting node to the selected at least one receiving node; and
at the selected at least one receiving node, using combined data of at least a portion of the at least one unsuccessfully decoded data packet and the forwarded packet in order to increase the chances of decoding.

11. The method of claim 10, further comprising, if the selected at least one receiving node is not able to successfully decode using the combined data, sending a second quality indicator to the transmitting node, the second quality indicator representing the degree of decodability of the combined data.

12. The method of claim 10, further comprising receiving the quality information associated with at least one unsuccessfully decoded data packet from plural nodes of the set, with the quality information received from each of the plural nodes respectively representing the degree of decodability of the at least one unsuccessfully decoded data packet at the respective plural nodes.

13. The method of claim 10, further comprising using the quality information to select at least one transmit or link parameter, and forwarding the forwarded data packet using the selected at least one transmit or link parameter.

14. The method of claim 10, further comprising:
using the quality information to select a flow among multiple flows represented in the transmitting node;
obtaining the forwarded data packet from a transmit queue of the transmitting node based on the selected flow.

15. The method of claim 10, further comprising selecting the at least one receiving node from said set of multiple candidate receiving nodes based on the quality information and at least one of:
information representing link performance between the transmitting node and the at least one node;
routing cost associated with at least one of said transmitting node and the at least one node; and
at least one quality of service parameter.

16. The method of claim 10, wherein the quality information comprises at least one of:
a posterior probability values which indicate how well bits are decoded for the at least one unsuccessfully decoded data packet;
a percentage of decodable information bits in the at least one unsuccessfully decoded data packet.

17. The method of claim 10, wherein the wireless network is a multihop network comprising plural relay nodes situated intermediate the transmitting node and a destination node, and wherein the method further comprises:
for at least one unsuccessfully decoded data packet, each of the plural relay nodes providing respective plural quality indications to the transmitting node;
the transmitting node using the respective plural quality indications to select a relay node to which to send a second packet, the second packet comprising data that is either identical to or offers at least some redundancy to the at least one unsuccessfully decoded data packet;
the selected relay node using the data from the at least one unsuccessfully decoded data packet and the second packet to increase chances of decoding.

18. The method of claim 17, further comprising:
at least some of the plural relay nodes providing the respective plural quality indications to one another;
the selected relay node using the respective plural quality indications of other relay nodes to determine an amount of data to forward to the other relay nodes for successful decoding by the other relay nodes.

19. A transmitting node comprising:
a receiver configured to receive quality information associated with at least one unsuccessfully decoded data packet from at least one nodes of a set of multiple candidate receiving nodes comprising a wireless network, the quality information representing a degree of decodability on a per packet basis of said at least one unsuccessfully decoded data packet at said at least one node, an unsuccessfully decoded data packet comprising one or more information bits having probability estimates which do not exceed a minimum required probability threshold;

a processor configured to use the quality information both:
- to select at least one receiving node from said set of multiple candidate receiving nodes to which to transmit a forwarded packet, the forwarded packet comprising at least a portion of the data contained in the at least one unsuccessfully decoded data packet; and
- to determine an amount of redundancy data to include in the forwarded packet; and a transmitter configured to forward the forwarded data packet to the selected at least one receiving node.

20. The transmitting node of claim 19, wherein the processor is configured to optimize an objective function that comprises said quality information.

21. The transmitting node of claim 19, wherein the receiver is configured to receive the quality information associated with at least one unsuccessfully decoded data packet from plural nodes of the set, with the quality information received from each of the plural nodes respectively representing the degree of decodability of the at least one unsuccessfully decoded data packet at the respective plural nodes.

22. The transmitting node of claim 19, wherein the processor is configured to further use the quality information to select at least one transmit or link parameter, and wherein the transmitter is configured to forward the forwarded data packet using the selected at least one transmit or link parameter.

23. The transmitting node of claim 19, wherein the processor is configured to use the quality information to select a flow among multiple flows represented in the transmitting node and to obtain the forwarded data packet from a transmit queue of the transmitting node based on the selected flow.

24. The transmitting node of claim 19, wherein the processor is configured to select the at least one receiving node from said set of multiple candidate receiving nodes based on the quality information and at least one of:
- information representing link performance between the transmitting node and the at least one node;
- routing cost associated with at least one of said transmitting node and the at least one node; and
- at least one quality of service parameter.

25. The transmitting node of claim 19, wherein the quality information comprises at least one of:
- a posterior probability values which indicate how well bits are decoded for the at least one unsuccessfully decoded data packet;
- a percentage of decodable information bits in the at least one unsuccessfully decoded data packet.

* * * * *

UNITED STATES PATENT AND TRADEMARK OFFICE
CERTIFICATE OF CORRECTION

PATENT NO. : 8,351,334 B2
APPLICATION NO. : 11/816071
DATED : January 8, 2013
INVENTOR(S) : Larsson et al.

It is certified that error appears in the above-identified patent and that said Letters Patent is hereby corrected as shown below:

In the Specification

In Column 4, Line 62, delete "an" and insert -- to an --, therefor.

In Column 8, Line 53, delete "it" and insert -- if --, therefor.

In Column 11, Line 67, delete "candidate," and insert -- candidate --, therefor.

In Column 12, Line 29, delete "(DP)," and insert -- (DP'), --, therefor.

In Column 12, Line 37, delete "(DP)" and insert -- (DP') --, therefor.

In Column 12, Line 61, delete "(DP)" and insert -- (DP') --, therefor.

In Column 13, Line 3, delete "(DP)" and insert -- (DP') --, therefor.

In Column 13, Line 4, delete "(DP)" and insert -- (DP') --, therefor.

In Column 15, Line 16, delete "Wideband." and insert -- Wideband --, therefor.

In Column 18, Line 19, in Equation (4), delete "$Z_{ik\phi}$" and insert -- $Z_{ij\phi}$ --, therefor.

In Column 23, Line 10, delete "receives," and insert -- receives --, therefor.

In Column 25, Line 57, delete "21A." and insert -- 210A. --, therefor.

In Column 26, Line 18, delete "Conf" and insert -- Conf. --, therefor.

Signed and Sealed this
Twenty-fourth Day of September, 2013

Teresa Stanek Rea
*Deputy Director of the United States Patent and Trademark Office*